United States Patent
Li et al.

(10) Patent No.: US 10,257,204 B2
(45) Date of Patent: Apr. 9, 2019

(54) INFORMATION PROCESSING METHOD AND ELECTRONIC APPARATUS

(71) Applicant: Lenovo (Beijing) Co., Ltd., Beijing (CN)

(72) Inventors: Fanzhi Li, Beijing (CN); Jianjun Pang, Beijing (CN); Xiaofan Fan, Beijing (CN); Yunlong Wei, Beijing (CN); Ran Wang, Beijing (CN); Peipei Niu, Beijing (CN); Jiazi Chen, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 240 days.

(21) Appl. No.: 14/573,444

(22) Filed: Dec. 17, 2014

(65) Prior Publication Data

US 2015/0381632 A1    Dec. 31, 2015

(30) Foreign Application Priority Data

Jun. 27, 2014  (CN) .......................... 2014 1 0302948
Aug. 20, 2014  (CN) .......................... 2014 1 0412634
(Continued)

(51) Int. Cl.
*G06F 21/10* (2013.01)
*H04L 29/06* (2006.01)
(Continued)

(52) U.S. Cl.
CPC ............ *H04L 63/105* (2013.01); *G06F 21/31* (2013.01); *G06F 21/44* (2013.01); *H04L 63/107* (2013.01);
(Continued)

(58) Field of Classification Search
CPC ........ G06F 21/35; G06F 1/3203; G06F 21/78; G06F 21/88; G06F 21/31; G06F 3/0484;
(Continued)

(56) References Cited

U.S. PATENT DOCUMENTS

| | | | | |
|---|---|---|---|---|
| 2002/0065625 A1* | 5/2002 | Xydis | ..................... | G06F 21/35 702/127 |
| 2007/0032195 A1* | 2/2007 | Kurisko | ................ | H04L 63/061 455/41.2 |

(Continued)

FOREIGN PATENT DOCUMENTS

| | | |
|---|---|---|
| CN | 1359483 A | 7/2002 |
| CN | 1864344 A | 11/2006 |

(Continued)

OTHER PUBLICATIONS

First Office Action dated Apr. 6, 2017 (9 pages including English translation) out of Chinese priority Application No. 201410412634.8.

(Continued)

*Primary Examiner* — Farid Homayounmehr
*Assistant Examiner* — Lizbeth Torres-Diaz
(74) *Attorney, Agent, or Firm* — Brinks Gilson & Lione; John C. Freeman

(57) ABSTRACT

The present application provides an information processing method and an electronic apparatus that can automatically adjust the electronic apparatus to an information inaccessible state, thus the information security is enhanced. The method includes the steps of when a current state of the electronic apparatus is an information accessible state, obtaining an information of at least one parameter for determining whether it is necessary to adjust the current state from the information accessible state to an information inaccessible state or not; determining whether the at least (Continued)

Detecting whether there is a first Bluetooth signal or not in a current detection range — S1001

If so, sending a first control command to a second electronic apparatus, — S1002 one parameter meets a first preset condition or not to obtain a first determination result; when the first determination result is YES, adjusting the current state of the electronic apparatus to the information inaccessible state.

27 Claims, 7 Drawing Sheets

(30) Foreign Application Priority Data

Aug. 26, 2014 (CN) .......................... 2014 1 0426345
Sep. 15, 2014 (CN) .......................... 2014 1 0469764

(51) Int. Cl.
  *H04W 12/08*  (2009.01)
  *G06F 21/31*  (2013.01)
  *G06F 21/44*  (2013.01)
  *H04W 88/02*  (2009.01)

(52) U.S. Cl.
  CPC ..... *H04W 12/08* (2013.01); *G06F 2221/2111* (2013.01); *G06F 2221/2139* (2013.01); *H04L 63/0853* (2013.01); *H04W 88/02* (2013.01)

(58) Field of Classification Search
  CPC ................. G06F 21/41; G06F 21/604; G06F 2221/0737; G06F 2221/0775; H04L 63/0428; H04L 63/10; H04L 63/20; H04L 67/1097; H04L 67/142
  See application file for complete search history.

(56) References Cited

U.S. PATENT DOCUMENTS

| | | | | |
|---|---|---|---|---|
| 2008/0057890 A1* | 3/2008 | McKillop | ............. | G06F 21/445 455/185.1 |
| 2009/0124200 A1* | 5/2009 | Hall | ..................... | H04W 48/16 455/41.2 |
| 2010/0120406 A1* | 5/2010 | Banga | ................... | G06F 1/3203 455/418 |
| 2012/0140676 A1 | 6/2012 | Kim et al. | | |
| 2013/0106613 A1 | 5/2013 | Lee et al. | | |
| 2013/0109379 A1* | 5/2013 | Shi | ........................ | H04W 48/16 455/434 |
| 2013/0227703 A1* | 8/2013 | Sotos | ..................... | H04L 69/14 726/26 |
| 2015/0065053 A1* | 3/2015 | Cho | ........................ | H04W 8/005 455/41.2 |
| 2015/0277854 A1* | 10/2015 | Zhang | ................... | G06F 1/1652 345/156 |
| 2015/0350338 A1* | 12/2015 | Barnett | ................... | H04L 67/22 709/203 |
| 2015/0358778 A1* | 12/2015 | Heo | ..................... | H04W 4/029 455/456.6 |

FOREIGN PATENT DOCUMENTS

| | | |
|---|---|---|
| CN | 101185365 A | 5/2008 |
| CN | 102375527 A | 3/2012 |
| CN | 103002159 A | 3/2013 |
| CN | 103136928 A | 6/2013 |
| CN | 103190138 A | 7/2013 |
| CN | 103198572 A | 7/2013 |
| CN | 103605126 A | 2/2014 |
| CN | 103677236 A | 3/2014 |
| CN | 103713155 | 4/2014 |
| CN | 103714825 A | 4/2014 |
| CN | 103926890 A | 7/2014 |
| CN | 103954928 A | 7/2014 |

OTHER PUBLICATIONS

Office Action, and English language translation thereof, in corresponding Chinese Application No. 201410412634.8, dated Nov. 1, 2017, 8 pages.
First Office Action dated Sep. 4, 2017 from corresponding Chinese Patent Application No. 201410302948.2 (17 pages including English translation).
Second Office Action dated Apr. 17, 2018 (14 pages including English translation) from Chinese priority Application No. 201410302948.2.
First Office Action dated Apr. 19, 2018 (38 pages including English translation) from Chinese priority Application No. 2014104263453.
First Office Action dated Apr. 23, 2018 (12 pages including English translation) from Chinese priority Application No. 201410469764.5.

* cited by examiner

INFORMATION PROCESSING METHOD AND ELECTRONIC APPARATUS

This application claims priority to Chinese Patent Application No. 201410302948.2 filed on Jun. 27, 2014, Chinese Patent Application No. 201410426345.3 filed on Aug. 26, 2014, Chinese Patent Application No. 201410469764.5 filed on Sep. 15, 2014, and Chinese Patent Application No. 201410412634.8 filed on Aug. 20, 2014, the entire contents of which are incorporated herein by reference.

BACKGROUND

The present application relates to a field of electronic technology, and more particularly, to an information processing method and an electronic apparatus.

With continuous development of science and technology, electronic technology also develops rapidly, there are more and more types of electronic products, and people also enjoy various conveniences brought about by scientific and technological development. Now people can enjoy a comfortable life along with scientific and technological development by using various types of electronic apparatuses.

As functions of the electronic apparatus have become increasingly diverse, there are more and more services available to users, so that there are also large amount of users' information stored on the electronic apparatus, such as the users' social networking accounts, bank accounts, browsing history, etc. Thus, security of the electronic apparatus must be ensured.

However, in the process of implementing technical solutions according to embodiments of the present application, inventors of the present application found that the above-mentioned technologies at least have technical facts as follows. In the conventional art, in order to ensure information security on the electronic apparatus, a user usually needs to manually logout the account or turn off the electronic apparatus. If the user forgets to logout or turn off the electronic apparatus when he/she leaves, the electronic apparatus will maintain an information accessible state, which may lead to malicious acquisition of the information on the electronic apparatus, and ultimately result in loss to the user.

Therefore, the electronic apparatus cannot automatically adjust its state to enhance information security.

SUMMARY

In one aspect, the present application provides an information processing method applied to an electronic apparatus, the method comprising: when a current state of the electronic apparatus is an information accessible state, obtaining an information of at least one parameter for determining whether it is necessary to adjust the current state from the information accessible state to an information inaccessible state or not; determining whether the at least one parameter meets a first preset condition or not to obtain a first determination result; when the first determination result is YES, adjusting the current state of the electronic apparatus to the information inaccessible state.

In another aspect, the present application provides an electronic apparatus, comprising: a first obtaining unit for, when a current state of the electronic apparatus is an information accessible state, obtaining an information of at least one parameter for determining whether it is necessary to adjust the current state from the information accessible state to an information inaccessible state or not; a first determining unit, for determining whether the at least one parameter meets a first preset condition or not to obtain a first determination result; a first controlling unit for, when the first determination result is YES, adjusting the current state of the electronic apparatus to the information inaccessible state. In still another aspect, the present application provides a preset electronic apparatus, comprising: a sending and receiving unit, for sending an inquiry command to an electronic apparatus to inquire an apparatus state of the electronic apparatus, and receiving an apparatus state information returned by the electronic apparatus; a second obtaining unit for, when the apparatus state information indicates that a current state of the electronic apparatus is an information accessible state, obtaining an information of at least one parameter for determining whether it is necessary to adjust the current state from the information accessible state to an information inaccessible state or not; a second determining unit, for determining whether the at least one parameter meets a first preset condition or not to obtain a first determination result; a second controlling unit for, when the first determination result is YES, adjusting the current state of the electronic apparatus to the information inaccessible state.

DETAILED DESCRIPTION

In technical solutions of the present application, when a current state of the electronic apparatus is an information accessible state, the information of at least one parameter is obtained for determining whether it is necessary to adjust the current state from the information accessible state to an information inaccessible state or not; then it is determined whether the at least one parameter meets a first preset condition or not, and a first determination result is obtained; and finally, when the first determination result is YES, the current state of the electronic apparatus is adjusted to the information inaccessible state, which enable the electronic apparatus to automatically adjust the state to enhance the information security when a user leaves. Accordingly, when the information of the at least one parameter obtained by the electronic apparatus meets the first preset condition, the information accessible state is automatically adjusted to the information inaccessible state, the information security of the electronic apparatus is enhanced.

Hereinafter, the technical solutions of the present application are described in detail in conjunction with accompanying drawings and specific embodiments. It should be understood that the embodiments of the present application and specific features in the embodiments are detailed illustration of the technical solutions of the present application, rather than limitation to the technical solutions. Without conflict, the embodiments of the present application and the technical features in the embodiments may be combined with each other.

In the embodiments of the present application, an information processing method and an electronic apparatus are provided. In specific implementation, the electronic apparatus may be a computer, a smart phone, or a tablet computer, etc. which will not be specifically limited in the embodiments of the present application.

Embodiment I

Figure 3:
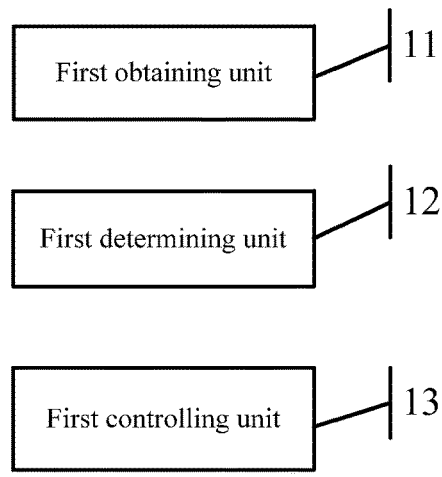
FIG. 3 is a structural schematic diagram of an electronic apparatus according to an embodiment of the present application.

Before introduction of an information processing method according to the embodiment of the present application, a basic structure of an electronic apparatus used in the method according to the embodiment of the present application will be introduced at first. As shown in FIG. 3, the electronic apparatus according to the embodiment of the present application comprises a first obtaining unit 11, a first determining unit 12, and a first controlling unit 13.

The first obtaining unit 11 is used for, when a current state of the electronic apparatus is an information accessible state, obtaining the information of at least one parameter for determining whether it is necessary to adjust the current state from the information accessible state to an information inaccessible state or not.

The first determining unit 12 determines whether the at least one parameter meets a first preset condition or not, to obtain a first determination result.

A first controlling unit 13 is used for, when the first determination result is YES, adjusting the current state of the electronic apparatus to the information inaccessible state.

Hereinafter, with reference to FIG. 1, the information processing method executed by the electronic apparatus according to the embodiment of the present application comprises: S11: when a current state of the electronic apparatus is the information accessible state, obtaining an information of at least one parameter for determining whether it is necessary to adjust the current state from the information accessible state to an information inaccessible state or not; S12: determining whether the at least one parameter meets a first preset condition or not to obtain a first determination result; S13: when the first determination result is YES, adjusting the current state of the electronic apparatus to the information inaccessible state.

First, when step S11 is executed, the current state of the electronic apparatus is the information accessible state. That is, when the electronic apparatus receives an information access request, the electronic apparatus can access corresponding information in memory or hard disk of the electronic apparatus where information is stored according to the access request. After the information is accessed, the corresponding information may be further obtained, for example, a copy information, transmission information or sending information.

Next, in order to enhance information security of the electronic apparatus, in the information accessible state, the electronic apparatus needs to obtain the information of at least one parameter for determining whether it is necessary to adjust the current state from the information accessible state to the information inaccessible state or not.

Specifically, in the embodiment of the present application, there is a variety of information of at least one parameter for indicating that it is necessary for the electronic apparatus to adjust the current state to the information inaccessible state, and then, step S11 can be implemented in a variety of modes. Here two types of modes will be exemplified and described in detail, whereas the specific implementation process includes, but not limited to, the two types of modes described below.

Type 1: obtaining a distance between the electronic apparatus and a preset electronic apparatus.

In order to avoid a case that the user forgets to adjust the state of the electronic apparatus when he/she leaves, such that the information on the electronic apparatus is accessed, for example, when the user opens his/her mailbox, and then leaves, forgetting to close the mailbox, it is easy for a second person to obtain the information from the user's mailbox, in the embodiment of the present application, it is necessary to obtain the distance for determining whether the user leaves the electronic apparatus or not.

Specifically, in order to obtain the distance between the electronic apparatus and the user, in the embodiment of the present application, it is just to obtain a distance between the electronic apparatus and the preset electronic apparatus.

Specifically, the electronic apparatus will pre-establish a list of preset electronic apparatus, and record in the list of the preset electronic apparatus the information such as an IP, a domain name of the preset electronic apparatus allowing to obtain the distance, which can exclusively identify the preset electronic apparatus to be included. In the embodiment of the present application, the preset electronic apparatus may be a mobile phone, a SmartWatch, a SmartBand, etc. of the user, which will not be specifically limited in the present application.

To obtain the distance, the preset electronic apparatus firstly needs to establish connection with the electronic apparatus, for example, to establish the connection by means of WIFI, Bluetooth, etc. After the electronic apparatus in the embodiment of the present application is connected with another electronic apparatus, when the distance there between needs to be obtained, the electronic apparatus obtains identifiers such as the IP and the domain name of the other electronic apparatus connected thereto, and compares them with the list of the preset electronic apparatus. If matching, the other electronic apparatus connected thereto is determined as the preset electronic apparatus, and the distance is obtained by the preset electronic apparatus. Of course, it may be determined whether the other electronic apparatus requesting to establish connection is the preset electronic apparatus or not before the other electronic apparatus in the embodiment of the present application is connected to the electronic apparatus. Those skilled in the art can choose to make a determination before the establishment or after the establishment as actually required, which will not be specifically limited in the present application.

For example, the electronic apparatus is specifically a desktop computer of a user A, and the preset electronic apparatus is a mobile phone of the user A. The user A pre-controls the electronic apparatus to obtain identifiers of his/her mobile phone, and controls the electronic apparatus to set his/her mobile phone as the preset electronic apparatus. It is assumed that at current time, the user A needs to send a picture to his/her mobile phone and a mobile phone of a user B by his/her own desktop computer, then both the user A and the user B establish connection between their mobile phones and the electronic apparatus via WIFI. After the desktop computer receives a connection request sent by the mobile phone of the user A and a connection request sent by the mobile phone of the user B, the desktop computer compares the identifiers of the mobile phones in the connection requests, and determines that only the mobile phone of the user A is the preset electronic apparatus, while the mobile phone of the user B is not the preset electronic apparatus. After determining the preset electronic apparatus, the desktop computer establishes connection with the two mobile phones, and sends a to-be-sent picture to the two mobile phones. However, when it is required to obtain the distance, the desktop computer only obtains the distance by connecting with the mobile phone of the user A.

Further, in the embodiment of the present application, the distance between the electronic apparatus and the preset electronic apparatus can be obtained in a variety of modes according to the embodiment of the present application, for example, by image analysis, by a distance sensor, etc. In the specific implementation process, how to obtain the distance between the electronic apparatus and the preset electronic apparatus is not limited in the present application. Here only two modes will be exemplified for detailed introduction.

Mode 1:

When it is necessary to obtain the distance, at least one frame of image may be acquired by a first image acquisition unit of the electronic apparatus, or a second image acquisition unit of the preset electronic apparatus, and the distance between the electronic apparatus and the preset electronic apparatus is obtained by analyzing the at least one frame of image.

1) If the distance is obtained by the first image acquisition unit, then the electronic apparatus firstly needs to determine where the preset electronic apparatus is in the image. In the specific implementation process, the preset electronic apparatus may be specifically a mobile electronic apparatus, then, when the user carrying the preset electronic apparatus steps away from the electronic apparatus, the distance between the electronic apparatus and the preset electronic apparatus is just a distance between the electronic apparatus and the user.

Then, after determining the preset electronic apparatus, the electronic apparatus can control the first image acquisition unit to acquire the image including the user. If there is only one user in the image, then the electronic apparatus can directly determine that the distance needed to be obtained is just the distance between the electronic apparatus and the only user in the image. If the image includes at least two users, then the electronic apparatus may display the image on a display unit of the electronic apparatus. After seeing the image, the user circles his/her own image in the electronic apparatus, and further, the electronic apparatus determines which user among the at least two users is the one from whom the distance needs to be obtained according to the circling by the user.

Description will be further made by taking the above example that the mobile phones of the user A and the user B transmit an image with the desktop computer of the user A at the same time. After the desktop computer determines that the mobile phone of the user A is the preset electronic apparatus, the desktop computer controls the first image acquisition unit to acquire the image including the user A and/or the user B, and displays the image on a display screen of the desktop computer. After seeing the image of the user A and/or the user B displayed on the display screen, the user A circles his/her own image. The desktop computer of the user A determines the user A according to the image circled by the user A, and then the desktop computer can obtain the distance between the desktop computer and the mobile phones of the user A by analyzing the image including the user A.

The mode for obtaining the distance between the electronic apparatus and the user by using the image of the user according to the embodiment of the present application is similar to a method for obtaining a distance by an image in the conventional art, which will not be described here.

2) If the distance is obtained by the second image acquisition unit, the user can control the second image acquisition unit to acquire the image. If the preset electronic apparatus is a mobile phone of the user, then the user can shoot at least one frame of image by directing a camera of the mobile phone to the electronic apparatus, and send the at least one frame of image to the electronic apparatus. The electronic apparatus determines the distance between the preset electronic apparatus and the electronic apparatus based on the at least one frame of image sent by the preset electronic apparatus.

Description will be further made by taking the above example that the mobile phones of the user A and the user B transmit an image with the desktop computer of the user A at the same time. After the desktop computer determines that the mobile phone of the user A is the preset electronic apparatus, when leaving the desktop computer, the user A holds his/her own mobile phone to shoot 6 images of the electronic apparatus, with every image sent to the desktop computer at each snapshot, so that the desktop computer calculates and obtains the distance.

Since only the mobile phone of the user A is the preset electronic apparatus, even if the user B also sends images to the desktop computer, the desktop computer will not obtain the distance from the images sent by the user B.

The mode for obtaining the distance between the electronic apparatus according to the embodiment of the present application and the preset electronic apparatus by using the image is similar to a method for obtaining a distance by an image in the conventional art, which will not be described here.

Mode 2:

The distance is obtained by a distance sensor.

The electronic apparatus can obtain the distance by the distance sensor, for example, the distance can be acquired by an ultrasonic sensor, an infrared distance sensor, etc.

For example, when the distance is obtained by the ultrasonic sensor, the ultrasonic sensor emits ultrasonic waves, the ultrasonic waves return to the ultrasonic sensor when encountering the preset electronic apparatus, and the electronic apparatus obtains the distance according to a return time.

Type 2: obtaining a wireless signal strength between the electronic apparatus and the preset electronic apparatus.

In order to avoid a case that the user forgets to adjust the state of the electronic apparatus when leaving the electronic apparatus, such that the information on the electronic apparatus is accessed, for example, when the user opens his/her mailbox, then leaves, forgetting to close the mailbox, it is easy for a second person to obtain the information from the user's mailbox, in the embodiment of the present application, it is necessary to obtain the wireless signal strength between the electronic apparatus in the embodiment of the present application and the preset electronic apparatus.

Specifically, in order to obtain the wireless signal strength between the electronic apparatus and the preset electronic apparatus, the electronic apparatus firstly needs to establish a wireless connection with the preset electronic apparatus. In the embodiment of the present application, the wireless connection between the electronic apparatus and the preset electronic apparatus can be established by means of WIFI, Bluetooth, infrared, etc., which will not be specifically limited in the present application.

Specifically, the electronic apparatus pre-establishes a list of the preset electronic apparatus, and records in the list of the preset electronic apparatus the information such as an IP, a domain name of the preset electronic apparatus allowing to obtain the current distance, which can exclusively identify the preset electronic apparatus to be included. In the embodiment of the present application, the preset electronic apparatus may be a mobile phone, a SmartWatch, a SmartBand, etc. of the user, which will not be specifically limited in the present application.

To obtain the wireless signal strength, the preset electronic apparatus firstly needs to establish connection with the electronic apparatus. After the electronic apparatus in the embodiment of the present application is connected with another electronic apparatus, when the wireless signal strength needs to be obtained, the electronic apparatus obtains identifiers such as the IP and the domain name of the other electronic apparatus connected thereto, and compares them with the list of the preset electronic apparatus; if matching, the other electronic apparatus connected thereto is determined as the preset electronic apparatus, and the wireless signal strength is obtained by the preset electronic apparatus. Of course, it may be determined whether the other electronic apparatus requesting to establish a connection is the preset electronic apparatus or not before the electronic apparatus in the embodiment of the present application is connected to another electronic apparatus, and those skilled in the art can choose to make a determination before the establishment or after the establishment as actually required, which will not be specifically limited in the present application.

For example, the electronic apparatus is specifically a desktop computer of a user A, and the preset electronic apparatus is a mobile phone of the user A; the user A pre-controls the electronic apparatus to obtain identifiers of his/her mobile phone, and controls the electronic apparatus to set his/her mobile phone as the preset electronic apparatus. It is assumed that at current time, the user A needs to send a picture to his/her mobile phone and a mobile phone of a user B by his/her own desktop computer, then both the user A and the user B establish connection between their mobile phones and the electronic apparatus via WIFI. After receiving a connection request sent by the mobile phone of the user A and a connection request sent by the mobile phone of the user B, the desktop computer compares the identifier of the mobile phones in the connection requests, and determines that only the mobile phone of the user A is the preset electronic apparatus, while the mobile phone of the user B is not the preset electronic apparatus. After determining the preset electronic apparatus, the desktop computer establishes connection with the two mobile phones, and sends a to-be-sent picture to the two mobile phones. However, when it is required to obtain the wireless signal strength, the desktop computer only obtains the wireless signal strength by connecting with the mobile phone of the user A.

After the information of at least one parameter for determining whether it is necessary to adjust the current state from the information accessible state to an information inaccessible state or not is obtained by step S1, it may be determined whether it is necessary to adjust the state of the electronic apparatus, i.e., step S2 is executed.

S2: whether the at least one parameter meets a first preset condition or not is determined, and the first determination result is obtained.

Specifically, since there are a variety of cases for the information of at least one parameter in the specific implementation process, when it is determined whether the at least one parameter meets the first preset condition or not, there are also a variety of implementing modes. Description will be further made by taking the above example that the information of at least one parameter is the distance or the wireless signal strength between the electronic apparatus and the preset electronic apparatus, whereas the specific implementation process includes, but not limited to, the two modes described as follows.

Mode 1: the information of at least one parameter is specifically the distance between the electronic apparatus and the preset electronic apparatus.

When the information of at least one parameter is specifically the distance between the electronic apparatus and the preset electronic apparatus, the specific implementation process of step S12 is: determining whether the distance is greater than a preset distance or not, and obtain the first determination result.

Specifically, in the embodiment of the present application, when the at least one parameter is specifically the distance, determining whether the information of at least one parameter meets the first preset condition or not is determining whether the distance is greater than the preset distance or not.

The preset electronic apparatus is a mobile electronic apparatus carried about by the user, for example, a mobile phone, a SmartWatch, etc. When the distance is greater than the preset distance, it indicates that the distance between the user and the electronic apparatus is relatively far. Therefore, in the embodiment of the present application, it is necessary to determine whether the distance is greater than the preset distance or not.

The preset distance may be a default setting in the electronic apparatus, for example, 3 m, 5.2 m, etc., or may also be set by the user according to his/her own habit and actual situation. For example, if a room where the electronic apparatus is located is 3 m×3.5 m, then the user can set the preset distance as 3 m, i.e., the distance for stepping out of the room, which will not be limited by the present application.

For example, if it is assumed that the preset distance is 3 m, and the distance obtained is 3.1 m, then the distance is greater than the preset distance, so the first determination result is YES; and if it is assumed that the preset distance is 4 m, and the distance obtained is 3.1 m, then the distance is less than the preset distance, so the first determination result is NO.

Mode 2: the information of at least one parameter is specifically the wireless signal strength.

When the information of at least one parameter is specifically the wireless signal strength between the electronic apparatus and the preset electronic apparatus, the specific implementation process of step S12 is: determining whether the wireless signal strength is less than a preset strength or not to obtain the first determination result.

Specifically, in the embodiment of the present application, when the at least one parameter is specifically the wireless signal strength, to determine whether the information of at least one parameter meets the first preset condition or not is to determine whether the wireless signal strength is less than the preset strength or not.

The preset electronic apparatus is a mobile electronic apparatus carried about by the user, for example, a mobile phone, a SmartWatch, etc. When the wireless signal strength between the electronic apparatus and the preset electronic apparatus is less than the preset strength, it indicates that the distance between the user and the electronic apparatus is relatively far. Therefore, in the embodiment of the present application, it is necessary to determine whether the wireless signal strength is less than the preset strength or not.

The preset strength may be a default setting in the electronic apparatus, for example, −40 dB, −48 dB, etc., or may also be set by the user according to his/her own habit and actual situation; for example, generally, WIFI signal strength is −3 dB~100 dB, and when connectivity between the electronic apparatus and the preset electronic apparatus is relatively good, the user sets the preset strength as −60 dB. In addition, the preset strength may be set according to the specific preset electronic apparatus, and specifically, the preset electronic apparatus may be a mobile phone, a SmartWatch, a tablet computer, etc. When different preset electronic apparatuses establish connection with the electronic apparatus at the same location in the same situation, the wireless signal strengths there between may also be different. For example, the wireless signal strength when a mobile phone is connected with another mobile phone via Bluetooth is greater than the wireless signal strength when the mobile phone is connected with a notebook computer via Bluetooth. Therefore, the preset strength in the embodiment of the present application may also be determined according to the specific type of the preset electronic apparatus. For example, when the preset electronic apparatus is a mobile phone, the preset strength is −80 dB; when the preset electronic apparatus is a SmartWatch, the preset strength is −60 dB; and when the preset electronic apparatus is a tablet computer, the preset strength is −70 dB. Of course, those skilled in the art can select as actually required, which will not be specifically limited by the present application.

For example, if it is assumed that the preset strength is −80 dB, and the wireless signal strength obtained is −100 dB, then the wireless signal strength is less than the preset strength, so the first determination result is YES; and if it is assumed that the preset strength is −80 dB, and the wireless signal strength obtained is −66 dB, then the wireless signal strength is greater than the preset strength, so the first determination result is NO.

Next, after the first determination result is obtained, step S13 is executed.

S13: when the first determination result is YES, adjusting the current state of the electronic apparatus to the information inaccessible state.

Specifically, if the at least one parameter is specifically the distance, and the first determination result is YES, it indicates that the distance between the electronic apparatus and the preset electronic apparatus is relatively far, then the user might have forgotten to adjust the state of the electronic apparatus, so the electronic apparatus is controlled to adjust the current state to the information inaccessible state. Thus, even if the user forgets or has no time to adjust the state of electronic apparatus when he/she leaves, the information of the electronic apparatus will not be stolen.

If only one parameter is specifically the wireless signal strength, and the first determination result is YES, it indicates that connectivity between the electronic apparatus and the preset electronic apparatus is relatively week, and this indicates that the user carrying the preset electronic apparatus might have moved away from the electronic apparatus, so the electronic apparatus is controlled to adjust the current state to the information inaccessible state. Thus, even if the user forgets or has no time to adjust the state of electronic apparatus when he/she leaves, the information of the electronic apparatus will not be stolen.

In the embodiment of the present application, the current state is adjusted to the information inaccessible state in step S13. In the specific implementation process, it is just to adjust the current state of the electronic apparatus to an Off state or a locked state, or to adjust at least one application in the electronic apparatus to a logout state.

Usually, a password is required when the electronic apparatus switches from the Off state or the locked state to a working state, so in the Off or sleep state, the information in the electronic apparatus is inaccessible, so that the security of the electronic apparatus is enhanced.

Similarly, when at least one application, such as WeChat, MSN, etc. in the electronic apparatus is in a logout state, the user's personal information such as a user name, a historical record, etc. in the at least one application cannot be accessed, and can not to be obtained, so the security of the electronic apparatus is enhanced.

Hereinafter, in order to clearly illustrate the technical solutions of the present application, a number of specific examples will be enumerated for illustration.

Example 1 it is assumed that the electronic apparatus is a tablet computer of the user, the preset electronic apparatus is a mobile phone of the user, and the user is watching a movie by using the electronic apparatus at home. It is assumed that the mobile phone and the tablet computer establish connection via WIFI, and after the connection, the tablet computer determines that the mobile phone of the user is just the preset electronic apparatus by inquiring an IP address of the mobile phone. When answering a work call, the user leaves right away with the mobile phone, but the tablet computer is still playing the movie. At this moment, the tablet computer detects that a signal strength of WIFI to which the mobile phone of the user is directly linked drops from −20 dB to −83 dB, and the preset signal strength is −80 dB, so the first determination result is YES. Next, a processor of the tablet computer generates and responds a locked mode command, to make the tablet computer stop playing the movie, and adjust it to the locked state. Then, although the user forgets to adjust the state of the tablet computer, a second person can no longer obtain information from the electronic apparatus.

Example 2 it is assumed that the electronic apparatus is the notebook computer of the user, the preset electronic apparatus is the SmartWatch of the user, and the user is transferring money by an online banking application. It is assumed that the notebook computer and the SmartWatch establish connection via Bluetooth, and the notebook computer determines that SmartWatch of the user is just the preset electronic apparatus before the establishment of connection. The user suddenly realizes that a very important thing is forgotten, and leaves the company right away, but it is very urgent, and the user has no time to logout the account in the application. Then the user starts the camera on the SmartWatch, shoots an image including the notebook computer via the camera, sends the image to the notebook computer, and then leaves. After receiving the image sent by the SmartWatch, the notebook computer analyzes the image and obtains that the distance from the SmartWatch and the user to the notebook computer is 6 m, while the preset distance in the notebook computer is 5 m, so the distance is greater than the preset distance, and the first determination result is YES. Next, the notebook computer generates and responds a control command, to automatically logout the account in the online banking application on the notebook computer, then the user's money is less susceptible to lose.

Further, in the embodiment of the present application, for convenience of the user, after step S3, the current state of the electronic apparatus may further be automatically adjusted back to the information accessible state, when the distance between the preset electronic apparatus and electronic apparatus is less than a second preset distance, or when the wireless signal strength is greater than a second preset strength. The preset distance and the second preset distance may be of the same value, or may be of different values, and the preset strength and the second preset strength may be of the same value, or may be of different values, which will not be specifically limited in the present application.

Illustration will be further provided by taking Example 1, it is assumed that the user returns home 1 hour later, and the mobile phone of the user can automatically re-establish WIFI connection with the tablet computer, after the connection, the tablet computer detects that the mobile phone of the user is just the preset electronic apparatus, and detects that the wireless signal strength at that time is −58 dB. It is assumed that the second preset wireless signal strength is −60 dB, then at that time, the wireless signal strength is greater than the second preset wireless signal strength, and the electronic apparatus will automatically unlock the tablet computer, so that the user can continue to watch the movie on the tablet computer directly.

Embodiment II

Figure 2:
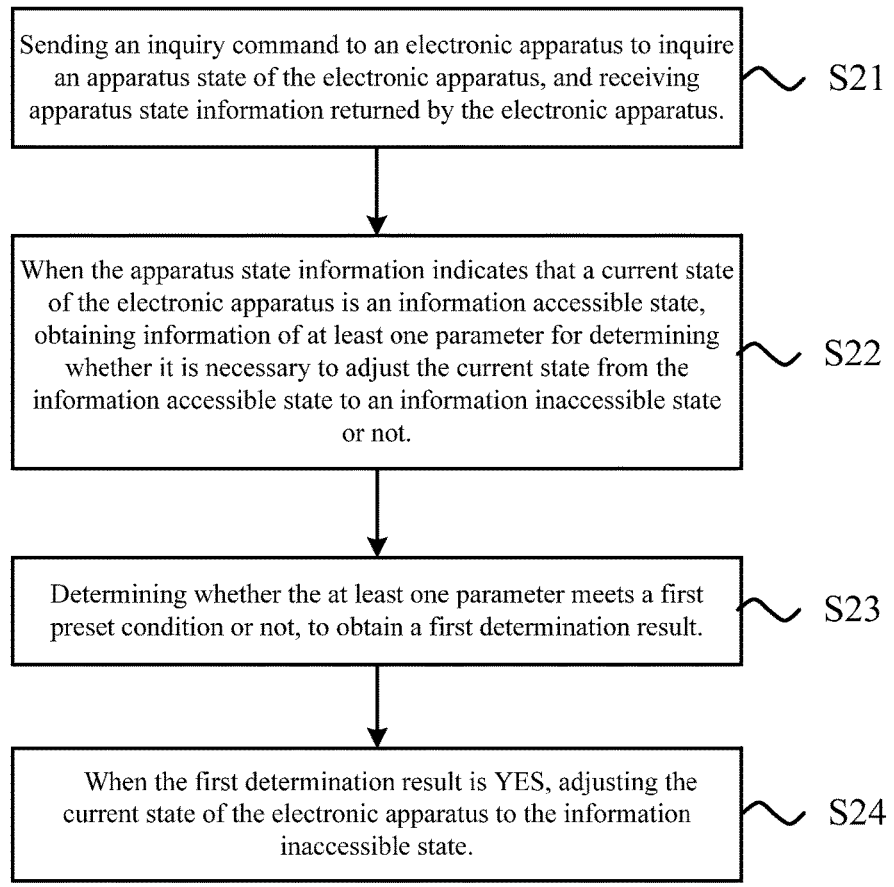
FIG. 2 is a flow chart of an information processing method executed by a preset electronic apparatus according to Embodiment II of the present application.

With reference to FIG. 2, an information processing method executed by the preset electronic apparatus according to an embodiment of the present application comprises steps as below.

S21: sending an inquiry command to an electronic apparatus to inquire an apparatus state of the electronic apparatus, and receiving apparatus state information returned by the electronic apparatus.

S22: when the apparatus state information indicates that a current state of the electronic apparatus is an information accessible state, obtaining an information of at least one parameter for determining whether it is necessary to adjust the current state from the information accessible state to an information inaccessible state or not.

S23: determining whether the at least one parameter meets a first preset condition or not to obtain a first determination result.

S24: when the first determination result is YES, adjusting the current state of the electronic apparatus to the information inaccessible state.

Firstly, to alleviate burden of the preset electronic apparatus, it is necessary to confirm the state of the electronic apparatus first in step S21. In the embodiment of the present application, the preset electronic apparatus sends an inquiry command to the electronic apparatus, and the electronic apparatus inquires its own apparatus state after receiving the inquiry command, and then sends the inquired apparatus state information to the preset electronic apparatus.

After receiving the apparatus state information sent by the electronic apparatus, the preset electronic apparatus determines the current state of the electronic apparatus according to the apparatus state information.

Next, step S22 is executed.

S22: when the apparatus state information indicates that a current state of the electronic apparatus is an information accessible state, the information of at least one parameter for determining whether it is necessary to adjust the current state from the information accessible state to an information inaccessible state or not is obtained.

When the received apparatus state information of the electronic apparatus indicates that the current state of the electronic apparatus is the information accessible state, the information of at least one parameter is obtained. Same as Embodiment I, the at least one parameter in Embodiment II may also be a distance or wireless signal strength between the electronic apparatus and the preset electronic apparatus, so the same points will not be described here one by one.

Different from Embodiment I, the information of at least one parameter obtained in Embodiment II is provided to the preset electronic apparatus for processing. For example, when the distance is being obtained in Embodiment I, all the images obtained by the electronic apparatus or the preset electronic apparatus are sent to the preset electronic apparatus, the distance is calculated by the preset electronic apparatus, and the distance obtained by a sensor is also obtained by the sensor on the preset electronic apparatus. Likewise, the wireless signal strength is also obtained by the preset electronic apparatus.

Next, step S23 is executed: determining whether the at least one parameter meets a first preset condition or not to obtain a first determination result.

The specific implementation process of determining whether the at least one parameter meets the first preset condition or not is the same as that in Embodiment I, so it will not be described here. What is different is that an executive subject in Embodiment II is the preset electronic apparatus, that is, it is the preset electronic apparatus that determines whether the at least one parameter meets the first preset condition or not, to obtain the first determination result.

Finally, step S24 is executed: when the first determination result is YES, the current state of the electronic apparatus is adjusted to the information inaccessible state.

Specifically, if the at least one parameter is specifically the distance, and the first determination result is YES, it indicates that the distance between the electronic apparatus and the preset electronic apparatus is relatively far, and the user might have forgotten to adjust the state of the electronic apparatus, so the preset electronic apparatus sends control information to the electronic apparatus, to control the current state of the electronic apparatus to be adjusted to the information inaccessible state. Thus, even if the user forgets or has no time to adjust the state of electronic apparatus when he/she leaves, the information of the electronic apparatus will not be stolen.

If at least one parameter is specifically the wireless signal strength, and the first determination result is YES, it indicates that connectivity between the electronic apparatus and the preset electronic apparatus is relatively week, and this indicates that the user carrying the preset electronic apparatus might have moved away from the electronic apparatus, so the preset electronic apparatus controls the current state of the electronic apparatus to be adjusted to the information inaccessible state. Thus, even if the user forgets or has no time to adjust the state of electronic apparatus when he/she leaves, the information of the electronic apparatus will not be stolen.

In the embodiment of the present application, the current state is adjusted to the information inaccessible state in step S23. In the specific implementation process, it is just to adjust the current state of the electronic apparatus to an Off state or a locked state, or to adjust at least one application in the electronic apparatus to a logout state.

Usually, a password is required when the electronic apparatus switches from the Off state or the locked state to a working state, so in the Off or sleep state, the information in the electronic apparatus is inaccessible, so that the security of the electronic apparatus is enhanced.

Similarly, when at least one application, such as WeChat, MSN, etc. in the electronic apparatus is in a logout state, the user's personal information, e.g., a user name, a historical record, etc. in the at least one application cannot be accessed, and cannot be obtained, so the security of the electronic apparatus is enhanced.

Further, in the embodiment of the present application, for convenience of the user, after step S24, the preset electronic apparatus may further send second control information to adjust the current state of the electronic apparatus back to the information accessible state, when the distance between the preset electronic apparatus and electronic apparatus is less than a second preset distance, or when the wireless signal strength is greater than a second preset strength. The preset distance and the second preset distance may be of the same value, or may be of different values, and the preset strength and the second preset strength may be of the same value, or may be of different values, which will not be specifically limited in the present application.

The above-mentioned step S24 and the step behind step S24 are the same as those in Embodiment I, and the same points will not be described one by one.

Embodiment III

With reference to FIG. 3, the present application provides an electronic apparatus, comprising: a first obtaining unit 11 for, when a current state of the electronic apparatus is an information accessible state, obtaining an information of at least one parameter for determining whether it is necessary to adjust the current state from the information accessible state to an information inaccessible state or not; a first determining unit 12, for determining whether the at least one parameter meets a first preset condition or not to obtain a first determination result; a first controlling unit 13 for, when the first determination result is YES, adjusting the current state of the electronic apparatus to the information inaccessible state.

Specifically, in the embodiment of the present application, the first obtaining unit 11 is specifically used for obtaining a distance between the electronic apparatus and a preset electronic apparatus.

When the information of at least one parameter is specifically the distance, the first determining unit 12 is specifically used for determining whether the distance is greater than a preset distance or not to obtain the first determination result.

In addition, the first obtaining unit 11 is also specifically used for obtaining a wireless signal strength between the electronic apparatus and a preset electronic apparatus.

At this time, the first controlling unit 13 is specifically used for determining whether the wireless signal strength is less than a preset strength or not to obtain the first determination result.

Further, the first controlling unit 13 is specifically used for: adjusting the current state of the electronic apparatus to an Off state; or adjusting the current state of the electronic apparatus to a locked state, or adjusting the current state of the electronic apparatus to a state that at least one application in the electronic apparatus is in a logout state.

Since Embodiment I and Embodiment III of the present application belong to one single general inventive concept, the same points will not be described here one by one.

Embodiment IV

Figure 4:
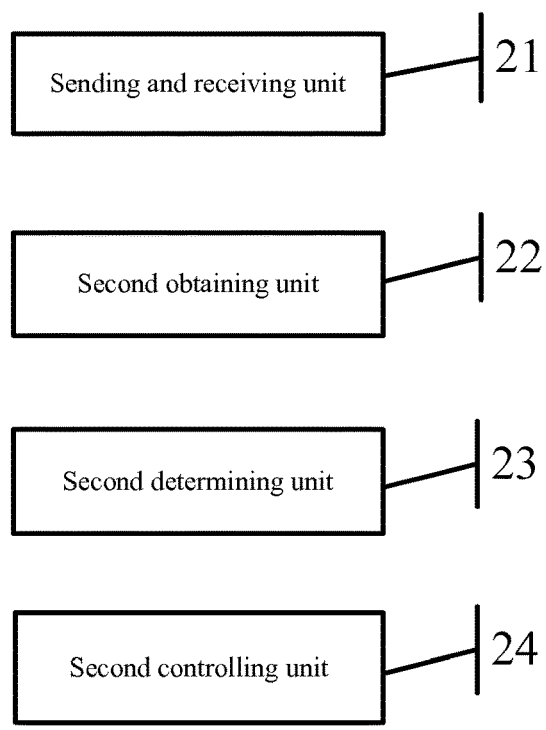
FIG. 4 is a structural schematic diagram of a preset electronic apparatus according to an embodiment of the present application.

With reference to FIG. 4, in the embodiment of the present application, a preset electronic apparatus comprises: a sending and receiving unit 21, for sending an inquiry command to an electronic apparatus to inquire an apparatus state of the electronic apparatus, and receiving an apparatus state information returned by the electronic apparatus; a second obtaining unit 22 for, when the apparatus state information indicates that a current state of the electronic apparatus is an information accessible state, obtaining an information of at least one parameter for determining whether it is necessary to adjust the current state from the information accessible state to an information inaccessible state or not; a second determining unit 23, for determining whether the at least one parameter meets a first preset condition or not to obtain a first determination result; a second controlling unit 24 for, when the first determination result is YES, adjusting the current state of the electronic apparatus to the information inaccessible state.

Specifically, in the embodiment of the present application, the second obtaining unit 22 is specifically used for obtaining a distance between the preset electronic apparatus and the electronic apparatus.

The second determining unit 23 is specifically used for determining whether the distance is greater than a preset distance or not to obtain the first determination result.

In addition, the second obtaining unit 22 may also be specifically used for obtaining a wireless signal strength between the preset electronic apparatus and the electronic apparatus.

The second determining unit 23 may further be specifically used for determining whether the wireless signal strength is less than a preset strength or not, to obtain the first determination result.

Further, the second controlling unit 24 is specifically used for sending control information to the electronic apparatus, to adjust the current state of the electronic apparatus to an Off state; or sending control information to the electronic apparatus, to adjust the current state of the electronic apparatus to a locked state, or sending control information to the electronic apparatus, to adjust the current state of the electronic apparatus to a state that at least one application in the electronic apparatus is in a logout state.

Since Embodiment II and Embodiment IV of the present application belong to one single general inventive concept, the same points will not be described here one by one.

The above-described one or more technical solutions in the embodiment of the present application at least have one or more technical effects as below.

1. In the technical solutions of the present application, when a current state of the electronic apparatus is an information accessible state, information of at least one parameter is obtained for determining whether it is necessary to adjust the current state from the information accessible state to an information inaccessible state or not; then it is determined whether the at least one parameter meets a first preset condition or not to obtain a first determination result; and finally, when the first determination result is YES, the current state of the electronic apparatus is adjusted to the information inaccessible state, which enable the electronic apparatus to automatically adjust the state to enhance the information security when a user leaves. Accordingly, when the at least one parameter obtained by the electronic apparatus meets the first preset condition, the information accessible state is automatically adjusted to the information inaccessible state, thus the information security of the electronic apparatus is enhanced.

2. In the technical solutions of the present application, the preset electronic apparatus firstly sends an inquiry command to an electronic apparatus to inquire an apparatus state of the electronic apparatus, and receives an apparatus state information returned by the electronic apparatus; then, when the apparatus state information indicates that a current state of the electronic apparatus is an information accessible state, the preset electronic apparatus obtains information of at least one parameter for determining whether it is necessary to adjust the current state from the information accessible state to an information inaccessible state or not, then determines whether the at least one parameter meets a first preset condition or not to obtain a first determination result, and finally, when the first determination result is YES, adjusts the current state of the electronic apparatus to the information inaccessible state, which enable the electronic apparatus to automatically adjust the state to enhance the information security when a user leaves. Accordingly, when the state of the electronic apparatus is the information accessible state, and the information of the at least one parameter meets the first preset condition, the preset electronic apparatus can automatically adjust the electronic apparatus from the information accessible state to the information inaccessible state, thus the information security of the electronic apparatus is enhanced.

Currently, the distance between the apparatuses may be obtained according to a wireless signal obtained, for example, the distance between the apparatuses may be obtained by measuring strength of the wireless signal. Usually, the distance between the apparatuses is typically determined by continuously scanning wireless signals, but such a mode of continuously scanning signals will cause high power consumption of the apparatus. For example, even for Bluetooth which is an apparatus of low power consumption, if a distance is measured by continuously scanning wireless signals, more than 20% power has to be consumed every day. Currently, in order to reduce power consumption of the apparatus, a technology for reducing frequency of scanning signal will be used, which, however, will result in slow response of apparatuses, and affect instantiating and accuracy of the ranging, thereby affecting the user experience.

Figure 5:
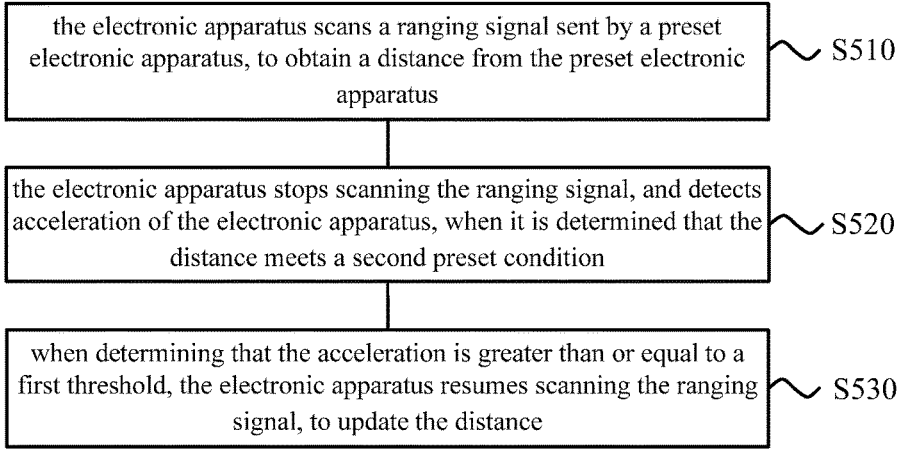
FIG. 5 shows a schematic flow chart of a ranging method according to an embodiment of the present application.

FIG. 5 shows a ranging method 500 according to an embodiment of the present application; the method can be executed, for example, by an electronic apparatus. As shown in FIG. 5, the method comprising: S510: the electronic apparatus scans a ranging signal sent by a preset electronic apparatus, to obtain a distance from the preset electronic apparatus; S520: the electronic apparatus stops scanning the ranging signal, and detects acceleration of the electronic apparatus, when it is determined that the distance meets a second preset condition; S530: when determining that the acceleration is greater than or equal to a first threshold, the electronic apparatus resumes scanning the ranging signal to update the distance.

The electronic apparatus obtains the distance from the preset electronic apparatus by scanning a ranging signal sent by the preset electronic apparatus. When it is determined that the distance meets a second preset condition, the scanning ends. The scanning of the ranging signal resumes until it is detected that the acceleration of the electronic apparatus is greater than or equal to the first threshold, and updates the distance between the two apparatuses. In other words, when the distance from the preset electronic apparatus is obtained by the scanned ranging signal, it is determined whether the distance meets a second preset condition; once the distance meets the second preset condition, scanning the ranging signal is stopped and the acceleration of the electronic apparatus is detected, and when the acceleration meets a certain condition (greater than or equal to the first threshold), the scanning the ranging signal sent by the preset electronic apparatus is resumed, to update the distance there between. That is, when scanning the ranging signal, it is determined whether to stop scanning the ranging signal according to a relationship between the distance obtained and the first threshold; when stopping the scanning, the acceleration of the electronic apparatus is detected, and it is determined whether to resume scanning the ranging signal according to a relationship between the acceleration and the ranging signal. Under the above conditions, continuously scanning the ranging signal can also be avoided on the premise that the distance between the electronic apparatus and the preset electronic apparatus is obtained, thus reducing the power consumption of the apparatus.

Thus, the ranging method according to the embodiment of the present application avoids continuously scanning the ranging signal by setting a preset condition for stopping scanning the ranging signal, which can effectively reduce the power consumption of the apparatus.

The electronic apparatus and the preset electronic apparatus in the embodiment of the present application can be understood as: the apparatuses having a communication protocol agreed with each other. That is, both apparatuses agree in advance on the ranging signal for ranging. For example, the two apparatuses agree in advance on ranging by transmitting a ranging signal A.

It should be understood that the ranging signal according to the embodiment of the present application may be specifically a wireless signal, such as a Wi-Fi signal, but the embodiment of the present application is not limited thereto, and it may also be other signals for ranging.

In S510, the distance from the preset electronic apparatus is obtained according to the ranging signal sent by the preset electronic apparatus. Specifically, the ranging signal may be a wireless signal, and the distance from the preset electronic apparatus may be obtained by measuring strength of the wireless signal. According to the scanned ranging signal, the distance from the preset electronic apparatus may be further obtained by other relevant technology, which is not specifically limited by the embodiment of the present application.

In S520, when it is determined that the distance meets a second preset condition, the electronic apparatus stops scanning the ranging signal, and detects acceleration of the electronic apparatus. The second preset condition may be that the distance exceeds or reaches a certain threshold, or may be that the distance is less than or falls to a certain threshold, which will be described in detail hereinafter.

Alternatively, in the embodiment of the present application, when it is determined that the distance meets a second preset condition, the electronic apparatus stopping scanning the ranging signal in step S520 includes: S521 when it is determined that the distance is less than or equal to a second threshold, the electronic apparatus stopping scanning the ranging signal.

Specifically, with the electronic apparatus being a mobile phone, and the preset electronic apparatus being a desktop computer as an example, when the user previously estimates that he/she will usually sit down to work when he/she is 0.6 m or less than 0.6 m away from the desktop computer, equivalently, the distance between the mobile phone and the desktop computer will not change at that time. In this scenario, the second threshold may be set as 0.6 m, that is, when it is determined that the distance between the apparatuses (between the mobile phone and the desktop computer) is less than or equal to 0.6 m, the mobile phone stops scanning the ranging signal sent by the desktop computer.

It should be understood that, during a period when scanning the ranging signal is stopped, it is default that the distance between the mobile phone and the desktop computer is the distance obtained before stopping the scanning.

Alternatively, in the embodiment of the present application, the electronic apparatus, when it is determined that the distance meets a second preset condition, stopping scanning the ranging signal in step S520, includes: S522: the electronic apparatus, when it is determined that the distance is greater than or equal to a third threshold, stopping scanning the ranging signal.

Specifically, still with the electronic apparatus being a mobile phone, and the preset electronic apparatus being a desktop computer as an example, when the user previously estimates that it may be difficult for the mobile phone to receive an effective ranging signal sent by the desktop computer when the distance from the mobile phone to the desktop computer is greater than 100 m, then it may be determined that scanning the ranging signal is stopped when the distance between the mobile phone and the desktop computer is up to 100 m. In this scenario, the third threshold may be set as 100 m; that is, when the distance between the apparatuses is greater than or equal to 100 m, the mobile phone stops scanning the ranging signal sent by the desktop computer.

It should be understood that, in the embodiment of the present application, the third threshold may be greater than the second threshold.

In S520, when it is determined the distance between the two apparatuses meets the second preset condition, scanning the ranging signal is stopped, and the acceleration of the electronic apparatus is detected. In S530, when the acceleration is detected to reach the first threshold, it may be considered that the electronic apparatus will move with respect to the preset electronic apparatus, and scanning the ranging signal sent by the preset electronic apparatus may be resumed. Specifically, still with the electronic apparatus being a mobile phone, and the preset electronic apparatus being a desktop computer as an example, if it is assumed that the acceleration when the user leaves the desktop computer is a, the first threshold may be set as a, that is, during a period when scanning the ranging signal is stopped, when the acceleration of the electronic apparatus is detected to be greater than or equal to a, scanning the ranging signal sent by the preset electronic apparatus may be resumed, to update the distance there between.

To facilitate understanding of the present application, a specific example is given below.

Scenario: the electronic apparatus obtains a distance from the preset electronic apparatus by scanning the ranging signal sent by the preset electronic apparatus.

1) When it is determined that the distance is less than a threshold Da, scanning the ranging signal is stopped;

2) An acceleration sensor of the electronic apparatus is monitored, to detect an acceleration a of the electronic apparatus;

3) When it is determined that the acceleration a is greater than a threshold A, scanning the ranging signal sent by the preset electronic apparatus is resumed, to update the distance from the preset electronic apparatus;

4) When it is determined that the distance obtained in 3) is greater than a threshold Db, scanning the ranging signal is stopped again;

5) The acceleration sensor of the electronic apparatus is monitored, to detect an acceleration b of the electronic apparatus;

6) When it is determined that the acceleration b is greater than a threshold B, scanning the ranging signal is resumed again, to update the distance from the preset electronic apparatus;

7) The above-described steps of 1) to 3) and/or 4) to 6) are looped, until the ranging task ends.

The thresholds Da and Db in the above process respectively correspond to the second threshold and the third threshold in the embodiment of the present application; the threshold A and the threshold B correspond to the first threshold in the embodiment of the present application. It should be understood that the threshold A and the threshold B may be the same or different, which will not be limited by the embodiment of the present application. It should be understood that the acceleration is a vector having both a value and a direction at the same time, and in the embodiment of the present application, a magnitude relationship between the absolute value of the acceleration of the electronic apparatus and the first threshold may be determined only.

It can be seen from the above that, in the technical solution provided by the embodiment of the present application, during the ranging process, by setting the second preset condition (the second threshold and the third threshold) for stopping scanning and the first threshold for starting scanning the ranging signal, the ranging signal is scanned when necessary to obtain and update the distance between the apparatuses; in a case that ranging is not necessary or the ranging condition is not met, scanning the ranging signal is stopped. That is, the technical solution provided by the embodiment of the present application, without affecting ranging between the apparatuses, avoids increased power consumption of the apparatus caused by continuously scanning the ranging signal in the conventional art.

In order to further reduce power consumption of the apparatus, in the embodiment of the present application, when the ranging signal is being scanned, detection of the acceleration of the electronic apparatus may be stopped.

Alternatively, in the embodiment of the present application, when the ranging signal is being scanned, detection of the acceleration of the electronic apparatus is stopped.

Thus, in the ranging method according to the embodiment of the present application, by setting the preset condition for stopping scanning the ranging signal and the first threshold for resuming scanning the ranging signal, a continuous scanning of the ranging signal is avoided in the ranging process, which can effectively reduce the power consumption of the apparatus.

It should be understood that, in the embodiment of the present application, the electronic apparatus may determine the second preset condition (the second threshold and/or the third threshold) and the first threshold according to pre-configured information of the user, or may automatically configure the second preset condition and the first threshold, for example, according to changes in surrounding environment, which will not be limited by the embodiment of the present application.

It should also be understood that the electronic apparatus in the embodiment of the present application may be any apparatus for ranging, or a plurality of apparatuses for ranging, which will not be limited by the embodiment of the present application. In other words, the ranging method according to the embodiment of the present application may be applied to any one or more apparatuses having a ranging task.

It should also be understood that the electronic apparatus and the preset electronic apparatus in the embodiment of the present application may be terminals, or base stations, or other apparatuses with a communication function, which will not be limited by the embodiment of the present application.

Figure 6:
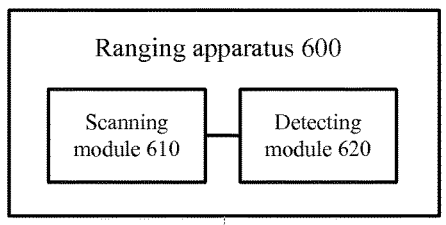
FIG. 6 shows a schematic block diagram of a ranging apparatus according to an embodiment of the present application.

As stated above, the ranging method according to the embodiment of the present application is described in conjunction with FIG. 5, and a ranging apparatus according to an embodiment of the present application will described now in conjunction with FIG. 6.

FIG. 6 shows a schematic block diagram of a ranging apparatus 600 according to an embodiment of the present application. As shown in FIG. 6, the apparatus 600 comprises: a scanning module 610, for scanning a ranging signal sent by a preset electronic apparatus to obtain a distance from the preset electronic apparatus, and further used for, when it is determined that the distance meets a second preset condition, stopping scanning the ranging signal; a detecting module 620 for, when the scanning module stops scanning the ranging signal, detecting an acceleration of the apparatus. The scanning module is further used for, when it is determined that the acceleration detected by the detecting module is greater than or equal to a first threshold, resuming scanning the ranging signal, to update the distance.

Therefore, the ranging apparatus according to the embodiment of the present application, by setting the preset condition for stopping scanning the ranging signal, avoids continuously scanning the ranging signal, which can effectively reduce the power consumption of the apparatus.

Alternatively, as an embodiment, the scanning module is specifically used for, when it is determined that the distance is less than or equal to a second threshold, stopping scanning the ranging signal.

Alternatively, as an embodiment, the scanning module is specifically used for, when it is determined that the distance is greater than or equal to a third threshold, stopping scanning the ranging signal.

Alternatively, as an embodiment, the detecting module is used for, when the scanning module is scanning the ranging signal, stopping detecting the acceleration of the apparatus.

It should be understood that, the ranging apparatus 600 according to the embodiment of the present application may correspond to the electronic apparatus in the ranging method 500 according to the embodiment of the present application, and the above-described and other operations and/or functions of respective modules in the ranging apparatus 600 are respectively intended to implement the corresponding flows of the respective methods in FIG. 5, which will not be described here for the sake of brevity.

Therefore, the ranging apparatus according to the embodiment of the present application avoids continuously scanning the ranging signal by setting the preset condition for stopping scanning the ranging signal, which can effectively reduce the power consumption of the apparatus.

It should be understood that, in various embodiments of the present application, serial numbers in the above-described respective processes do not mean an execution order, but the order to execute the respective processes should be determined by functions and internal logic thereof, and the serial numbers shall not constitute any limitation to the implementation process of the embodiment of the present application.

Figure 1:
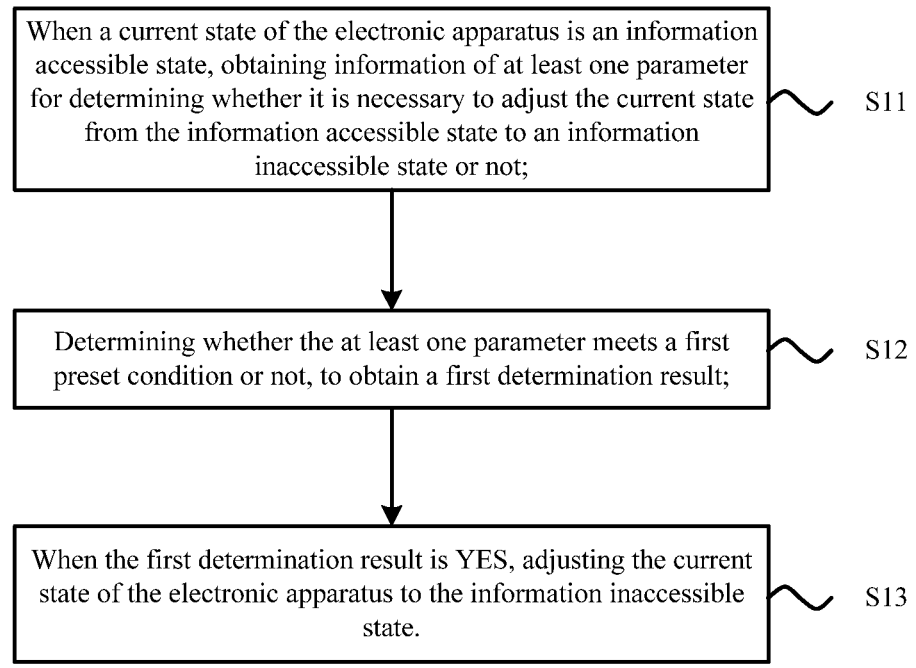
FIG. 1 is a flow chart of an information processing method executed by an electronic apparatus according to Embodiment I of the present application.

The ranging method described in conjunction with FIG. 5 can be used for measuring the distance between any two apparatuses, which, for example, may be used for obtaining the distance between the electronic apparatus and the preset electronic apparatus as described in conjunction with FIG. 1. That is to say, the obtaining the distance between the electronic apparatus and the preset electronic apparatus may include: the electronic apparatus scanning a ranging signal sent by the preset electronic apparatus, to obtain the distance from the preset electronic apparatus; when it is determined that the distance from the preset electronic apparatus meets a second preset condition, the electronic apparatus stopping scanning the ranging signal, and detecting an acceleration of the electronic apparatus; when it is determined that the acceleration is greater than or equal to a first threshold, the electronic apparatus resuming scanning the ranging signal, to update the distance between the electronic apparatus and the preset electronic apparatus. Further, in the preset electronic apparatus, the ranging method described in conjunction with FIG. 5 is also implemented, which is used for obtaining the distance between the preset electronic apparatus and the electronic apparatus.

Similarly, the ranging apparatus described in conjunction with FIG. 6 can be used for measuring a distance between itself and any other apparatus, which, for example, may be used for obtaining the distance between the electronic apparatus and the preset electronic apparatus as described in conjunction with FIG. 3 and FIG. 4. That is to say, the first obtaining unit or the second obtaining unit may include the scanning module and the detecting module in FIG. 6. The scanning module located in a first electronic apparatus scans a ranging signal sent by a second electronic apparatus, to obtain a distance between the first electronic apparatus and the second electronic apparatus, and when it is determined that the distance between the first electronic apparatus and the second electronic apparatus meets a second preset condition, stops scanning the ranging signal. The detecting module is used for, when the scanning module stops scanning the ranging signal, detecting an acceleration of the first electronic apparatus. When the acceleration detected by the detecting module is greater than or equal to a first threshold, the scanning module resumes scanning the ranging signal, to update the distance between the first electronic apparatus and the second electronic apparatus.

Currently, when it is to measure a wireless signal strength in a portable terminal apparatus on a preset position, a wireless connection with the portable terminal apparatus is established first, then it is also necessary for the user to place the to-be-measured portable terminal apparatus on the preset position, and finally the wireless signal strength of the to-be-measured portable terminal apparatus on the set position can be obtained, whereby the measuring procedure of the wireless signal strength is more complicated and less practical.

Figure 7:
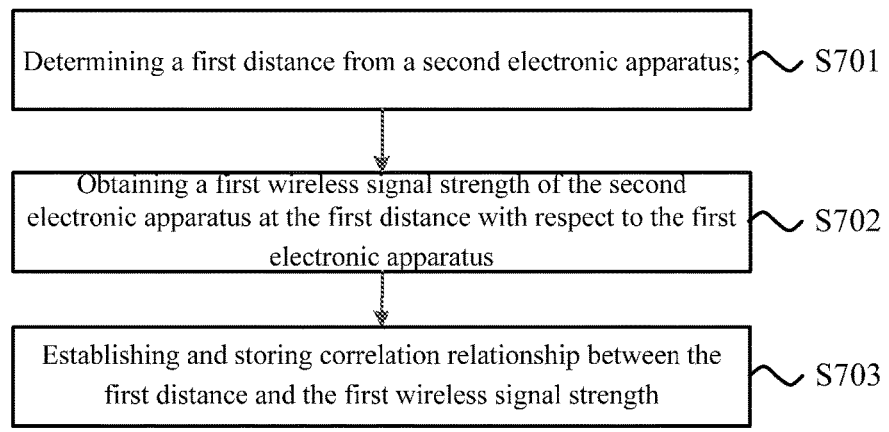
FIG. 7 is a flow chart of an information processing method according to an embodiment of the present application.

FIG. 7 is a flow chart of an information processing method according to an embodiment of the present application. The information processing method can be used for obtaining a wireless signal strength between two electronic apparatuses. The information processing method is applied to a first electronic apparatus. The information processing method includes: S701: determining a first distance from a second electronic apparatus; S702: obtaining a first wireless signal strength of the second electronic apparatus at the first distance with respect to the first electronic apparatus; and S703: establishing and storing correlation relationship between the first distance and the first wireless signal strength.

S701: the first electronic apparatus determines a first distance from a second electronic apparatus.

First, in the embodiment of the present application, the first electronic apparatus includes a wireless communication module, such as a Bluetooth module or other modules having a wireless communication function, the second electronic apparatus also includes a wireless communication module, in order to obtain the wireless signal strength of the second electronic apparatus on a certain reference position.

Further, in order to detect the first distance between the second electronic apparatus and the first electronic apparatus more accurately, the first electronic apparatus will display a reference image, and the reference image may be a two dimension code image or other image.

If the second electronic apparatus is to completely acquire the reference image, it needs to move to a specific reference position. For example, a position 30 cm horizontally away from the first electronic apparatus, where the second electronic apparatus can completely acquire the reference image. For example, the user holds a mobile phone to shot the two dimension code image displayed on the notebook computer.

After the second electronic apparatus completes acquisition of the reference image, the second electronic apparatus will generate a response signal, and then sends the response signal to the first electronic apparatus by its own wireless communication module.

Further, in the process that the second electronic apparatus acquires the reference image, the wireless communication module in the first electronic apparatus and the wireless communication module in the second electronic apparatus establish a communication link via a wireless protocol, for example a Bluetooth protocol.

Moreover, the second electronic apparatus according to the embodiment of the present application may carry a link key in the response signal sent to the first electronic apparatus, and the first electronic apparatus matches the link key with a preset key, if the link key matches the preset key, the wireless communication module in the first electronic apparatus and the wireless communication module in the second electronic apparatus establish a wireless communication link.

When the first electronic apparatus receives the response signal sent by the second electronic apparatus, the first electronic apparatus will detect the first distance between the second electronic apparatus and itself, in the embodiment of the present application, the distance detecting modes may be described as below.

Mode 1: in this mode, an image acquisition unit in the first electronic apparatus may determine the first distance from the first electronic apparatus by acquiring an image of the second electronic apparatus and then analyzing the image. Specifically, the image acquisition unit in the first electronic apparatus acquires an acquisition image corresponding to the second electronic apparatus, and determines the first distance corresponding the acquisition image acquired by the image acquisition unit according to a corresponding relationship between the acquisition image and the distance, for example, 50 cm corresponding to an acquisition image and 1 m corresponding to another acquisition image. The first distance is the distance between the first electronic apparatus and the second electronic apparatus.

Mode 2: the first distance between the first electronic apparatus and the second electronic apparatus is determined by a distance sensor in the first electronic apparatus. In Mode 2, the distance sensor in the first electronic apparatus may detect communication signal strength in the second electronic apparatus. The communication signal strength may be mobile phone signal strength, and the first distance between the first electronic apparatus and the second electronic apparatus is determined by the communication signal strength. Of course, the distance sensor may also be a sensor which directly positions the distance.

In the embodiment of the present application, in addition to the above two modes for determining the first distance between the first electronic apparatus and the second electronic apparatus, the first distance between the first electronic apparatus and the second electronic apparatus may also be obtained in other distance detecting modes, of which the specific implementing modes will not be limited by the embodiment of the present application.

S702: obtaining a first wireless signal strength of the second electronic apparatus at the first distance with respect to the first electronic apparatus.

Since in the process that the second electronic apparatus acquires a reference image, the wireless communication module in the first electronic apparatus and the wireless communication module in the second electronic apparatus establish a communication link, after the first distance between the first electronic apparatus and the second electronic apparatus is determined, the first electronic apparatus will detect a first wireless signal strength of the wireless communication module in the second electronic apparatus at the first distance. For example, after the second electronic apparatus completes the acquisition of the reference image at a position 30 cm away from the first electronic apparatus, the first electronic apparatus will acquire the first wireless signal strength of the second electronic apparatus at the distance of 30 cm.

S703: establishing and storing correlation relationship between the first distance and the first wireless signal strength.

After the first wireless signal strength of the second electronic apparatus at the first distance is obtained, the first electronic apparatus establishes and stores the correlation relationship between the first distance and the first wireless signal strength, for example, the wireless signal strength corresponding to 30 cm. By the correlation relationship, the first electronic apparatus can deduce second wireless signal strength of the second electronic apparatus at a second distance, and third wireless signal strength at a third distance.

As can be seen from the above-described method, the wireless communication has been established in the process that the second electronic apparatus acquires the reference image displayed on the first electronic apparatus, and when the first electronic apparatus completes the acquisition of the reference image, the first electronic apparatus can acquire the first wireless signal strength of the second electronic apparatus at a reference position, so that the acquisition of the wireless signal strength is more convenient and efficient, and meanwhile accuracy for acquiring the wireless signal strength is also enhanced.

Further, since the correlation relationship between the first distance and the first wireless signal strength is stored in the first electronic apparatus, after the first wireless signal strength of the second electronic apparatus at the first distance is obtained, the first electronic apparatus will determine a second wireless signal strength of the second electronic apparatus at the second distance which is greater than the first distance, according to the correlation relationship between the first distance and the first wireless signal strength. Specifically, the wireless signal strength and the distance present an exponential relationship, and the second wireless signal strength at the second distance is determined according to the first wireless signal strength at the first distance and the exponential relationship between the wireless signal strength and the distance. The relational expression between the distance and the wireless signal strength in the embodiment of the present application may be:

$$X = \frac{1}{Y^2} Y$$

Where, X represents the first wireless signal strength of the second electronic apparatus at the first distance, Y represents the second wireless signal strength of the second electronic apparatus at the second distance, and r represents a difference value between the second distance and the first distance. As can be seen from the above relational expression, the farther the second electronic apparatus is away from the first electronic apparatus, the weaker the wireless signal strength of the second electronic apparatus detected by the first electronic apparatus is.

Thus, after the first wireless signal strength of the first electronic apparatus at the first distance is determined, the first electronic apparatus can determine the second wireless signal strength which the second electronic apparatus should have at the second distance. For example, if the first wireless signal strength is A when the second electronic apparatus is 30 cm away from the first electronic apparatus, then the first electronic apparatus can determine that the second wireless signal strength is B when the distance between the second electronic apparatus and the first electronic apparatus is 2 m, B being less than A. The second wireless signal strength at this time may be taken as a fourth threshold for determining whether to switch the first electronic apparatus from a screen-locked mode to an unlocked mode. For example, when the second electronic apparatus detects that the wireless signal strength of the first electronic apparatus is greater than or equal to B, the first electronic apparatus is switched from the screen-locked mode to the unlocked mode.

Further, after the first wireless signal strength of the second electronic apparatus at the first distance is obtained, the first electronic apparatus will determine a third wireless signal strength of the second electronic apparatus at the third distance which is greater than the second distance, according to the first wireless signal strength at the first distance. Specifically, the wireless signal strength and the distance present an exponential relationship, and the farther the second electronic apparatus is away from the first electronic apparatus, the weaker the signal strength of the second electronic apparatus detected by the first electronic apparatus is. Thus, after the second wireless signal strength of the first electronic apparatus at the first distance is determined, the first electronic apparatus can determine the third wireless signal strength which the second electronic apparatus should have at the third distance. For example, if the first wireless signal strength is A when the second electronic apparatus is 30 cm away from the first electronic apparatus, then the first electronic apparatus can determine that, the second wireless signal strength is C when the distance between the second electronic apparatus and the first electronic apparatus is 5 m, C<B<A, and the third wireless signal strength at this time may be taken as a fifth threshold for determining whether to switch the first electronic apparatus from an unlocked mode to a screen-locked mode. For example, when the second electronic apparatus detects that the wireless signal strength of the first electronic apparatus is greater than or equal to B, the first electronic apparatus will be switched from the screen-locked mode to the unlocked mode.

Of course, in addition to setting the fourth threshold and the fifth threshold by the first wireless signal strength at the first distance in the embodiment of the present application, other thresholds for controlling the first electronic apparatus to switch modes may further be set according to the first wireless signal strength detected in the embodiment of the present application, which will not be described here.

In the embodiment of the present application, when the first electronic apparatus displays a reference image, the first distance between the first electronic apparatus and the second electronic apparatus, and the first wireless signal strength of the second electronic apparatus at the first distance are determined by receiving a response signal sent by the second electronic apparatus. That is to say, in the embodiment of the present application, after the first electronic apparatus displays the reference image, as long as the second electronic apparatus completes the acquisition of the reference image, the first electronic apparatus can obtain the wireless signal strength of the second electronic apparatus on a specific position, whereby avoiding such a complicated operation of moving the second electronic apparatus to a selected position to measure the wireless signal strength, so the method for measuring the wireless signal strength of the electronic apparatus on a specific position is simplified.

Figure 8:
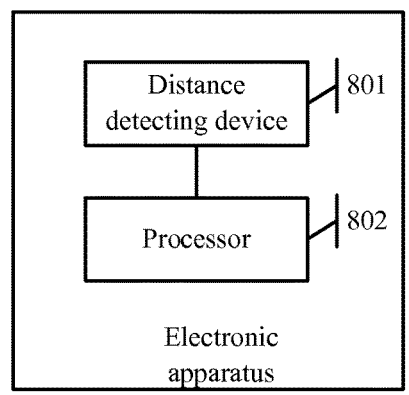
FIG. 8 is a structural schematic diagram of an electronic apparatus according to an embodiment of the present application.

Corresponding to an information processing method according to the embodiment of the present application, an embodiment of the present application further provides an electronic apparatus, and FIG. 8 is a structural schematic diagram of an electronic apparatus according to an embodiment of the present application, the electronic apparatus comprising: a distance detecting device 801, for determining a first distance between the electronic apparatus and another electronic apparatus; a processor 802, for obtaining a first wireless signal strength of the other electronic apparatus at the first distance with respect to the electronic apparatus, and establishing and storing correlation relationship between the first distance and the first wireless signal strength.

Further, the distance detecting device 801 is specifically used for displaying a reference image, receiving a response signal sent by the other electronic apparatus, and determining the first distance from the other electronic apparatus according to the response signal. The response signal indicates that the other electronic apparatus completes the acquisition of the reference image.

Further, the distance detecting device 801 includes: an image acquisition device for, when the response signal is received, acquiring an acquisition image corresponding to the other electronic apparatus; a distance sensor for, determining the first distance corresponding to the acquisition image according to a corresponding relationship between the acquisition image and the distance, the first distance being the distance from the other electronic apparatus.

Further, the electronic apparatus further comprises: a wireless communication module, specifically used for establishing a wireless communication link with a wireless communication module of the other electronic apparatus.

The processor, further specifically used for obtaining a first wireless signal strength of the other electronic apparatus at the first distance via the wireless communication module.

Further, the processor 802 is further used for determining a second wireless signal strength of the other electronic apparatus at a second distance greater than the first distance according to the correlation relationship between the first distance and the first wireless signal strength, and taking the second wireless signal strength as a fourth threshold for determining whether to switch the first electronic apparatus from a screen-locked mode to an unlocked mode.

Further, the processor 802 is further used for determining a third wireless signal strength of the other electronic apparatus at a third distance which is greater than the second distance according to the correlation relationship between the first distance and the first wireless signal strength. The third wireless signal strength is less than the second wireless signal strength, and the third wireless signal strength is taken as a fifth threshold for determining whether to switch the electronic apparatus from an unlocked mode to a screen-locked mode.

The information processing method described in conjunction with FIG. 7 can be used for measuring the wireless signal strength between any two apparatuses, which, for example, may be used for obtaining the wireless signal strength between the electronic apparatus and the preset electronic apparatus as described in conjunction with FIG. 1. That is to say, the obtaining the wireless signal strength between the electronic apparatus and the preset electronic apparatus in FIG. 1 may include: the electronic apparatus predetermining a first distance from the preset electronic apparatus; obtaining a first wireless signal strength of the preset electronic apparatus at the first distance with respect to the electronic apparatus; establishing and storing correlation relationship between the first distance and the first wireless signal strength; and determining the wireless signal strength corresponding to the distance between the electronic apparatus and the preset electronic apparatus according to the correlation relationship. Further, in the preset electronic apparatus, the information processing method described in conjunction with FIG. 7 is also implemented, which is used for obtaining the wireless signal strength between the preset electronic apparatus and the electronic apparatus.

Similarly, the apparatus described in conjunction with FIG. 8 can be used for measuring a distance between an electronic apparatus and any other apparatus, which, for example, may be used for obtaining the wireless signal strength between the electronic apparatus and the preset electronic apparatus described in conjunction with FIG. 3 and FIG. 4. That is to say, the first obtaining unit in FIG. 3 and the second obtaining unit in FIG. 4 may include the scanning module and the detecting module in FIG. 6. The scanning module located in a first electronic apparatus scans a ranging signal sent by a second electronic apparatus, to obtain a distance between the first electronic apparatus and the second electronic apparatus, and when it is determined that the distance between the first electronic apparatus and the second electronic apparatus meets a second preset condition, stops scanning the ranging signal. The detecting module is used for, when the scanning module stops scanning the ranging signal, detecting an acceleration of the first electronic apparatus. When the acceleration detected by the detecting module is greater than or equal to a first threshold, the scanning module resumes scanning the ranging signal, to update the distance between the first electronic apparatus and the second electronic apparatus.

Embodiments of the present application as below provide a method, a device and a system for switching operating modes, which avoid relatively complicated operation of remote control and slow response.

An embodiment of the present application provides a method for switching operating modes, the method is applied to a first electronic apparatus, the first electronic apparatus receives a first control command for switching the operating modes, and the first electronic apparatus will switch a first operating mode to a second operating mode different from the first operating mode according to the first control command. It should be noted that the first control command is a command transmitted based on a Bluetooth protocol. Thereby, the second electronic apparatus is controlled in a short range to switch the operating modes.

Hereinafter, technical solutions of the present application are described in detail by accompanying drawings and specific embodiments.

Figure 9:
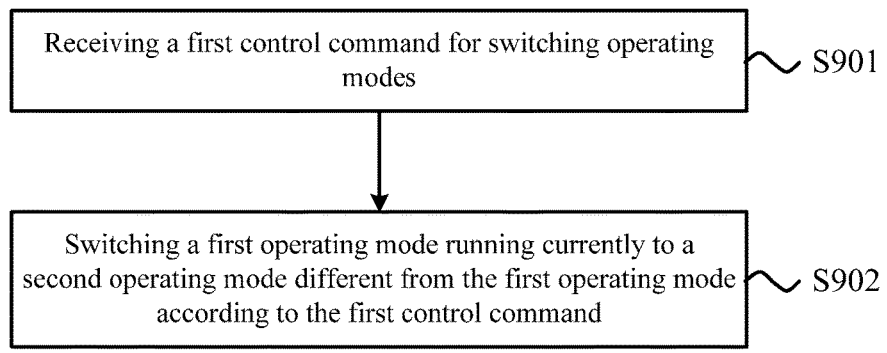
FIG. 9 is a flow chart of a method for switching operating modes according to an embodiment of the present application.

FIG. 9 is a flow chart of a method for switching operating modes according to an embodiment of the present application. The method comprises steps of S901 to S902 as below.

S901: receiving a first control command for switching the operating modes;

The method provided by the embodiment of the present application is applied to a first electronic apparatus, and a Bluetooth module is set in the first electronic apparatus. When the first electronic apparatus is in a first operating mode, the Bluetooth module is still running, wherein the first operating mode is an Off mode. Simply speaking, even if the first electronic apparatus is turned off, the Bluetooth module in the first electronic apparatus will continue to run.

If the Bluetooth module in the second electronic apparatus detects a Bluetooth signal of a Bluetooth module in the first electronic apparatus, the Bluetooth module in the second electronic apparatus first establishes a communication link with the Bluetooth module in the first electronic apparatus. The mode for establishing the communication link is a technical means commonly used in the conventional art, which will not be described here.

Further, in order to ensure security of the first electronic apparatus, or to manage access rights of the first electronic apparatus, in the process that the Bluetooth module in the second electronic apparatus establishes a communication link with the Bluetooth module in the first electronic apparatus, the second electronic apparatus needs to send a matching key to the first electronic apparatus via its own Bluetooth module. After the Bluetooth module in the first electronic apparatus obtains the matching key, the first electronic apparatus matches the obtained matching key with a pre-stored key. If the matching key matches the pre-stored key, then the Bluetooth module in the first electronic apparatus establishes the communication link with the Bluetooth module in the second electronic apparatus. Of course, the communication link established here is a communication link based on the Bluetooth protocol.

After the communication link is established, the Bluetooth module in the second electronic apparatus will perform real-time detection on whether a Bluetooth signal strength of the Bluetooth module in the first electronic apparatus is greater than or equal to a first preset threshold or not. The first preset threshold may be set according to distribution of signal strength of the Bluetooth module in the first electronic apparatus, for example, if the Bluetooth signal strength of the Bluetooth module in the first electronic apparatus is A within a scope of 10 m, at this time, the first preset threshold may be set as A. Of course, the first preset threshold may further be adjusted according to different application scenarios and signal strengths of different types of Bluetooth modules.

If it is detected that a Bluetooth signal strength of the Bluetooth module in the second electronic apparatus is greater than or equal to the first preset threshold. That is, the distance from the second electronic apparatus to the first electronic apparatus is less than or equal to 10 m, the second electronic apparatus will send a first control command to the first electronic apparatus. The first control command is also a command transmitted based on the Bluetooth protocol.

Specifically, in the embodiment of the present application, the first control command is used for controlling the first electronic apparatus to switch the operating modes.

S902: switching the first operating mode running currently to the second operating mode different from the first operating mode according to the first control command.

When the first electronic apparatus receives the first control command, the first electronic apparatus will respond to the first control command, and then the first electronic apparatus will switch from the first operating mode running currently to the second operating mode different from the first operating mode. It should be noted that the first operating mode may be an Off mode, and the second operating mode may be a normal operating mode. That is, after the first electronic apparatus receives the first control command, the first electronic apparatus will start from the Off state.

Of course, the first operating mode here may further be a sleep mode or a suspend mode. In the embodiment of the present application, the first operating mode and the second operating mode are not specifically defined, and in the embodiment of the present application, the user can customize the first operating mode and the second operating mode.

Further, in order to ensure security and stability of the first electronic apparatus, a startup key will be carried in the first control command. So, when the first electronic apparatus receives the first control command sent by the second electronic apparatus, the first electronic apparatus will not respond directly, but acquire the startup key carried in the first control command, and match the startup key with a preset key. When startup key matches the preset key, switch the first operating mode running currently is switched to the second operating mode. Of course, if the startup key does not match the preset key, then the first electronic apparatus directly discards the first control command.

Further, after the first electronic apparatus switches from the first operating mode to the second operating mode, the first electronic apparatus will detect whether the Bluetooth signal strength of the Bluetooth module in the second electronic apparatus is less than or equal to a second preset threshold. If the Bluetooth signal strength of the second Bluetooth module is less than or equal to the second preset threshold, the first electronic apparatus will acquire a second control command for switching operating states, and the first electronic apparatus will switch from the second operating mode to the first operating mode according to the second control command, whereby the second electronic apparatus can trigger the first electronic apparatus to automatically switch modes, so as to facilitate and simplify the user's operation, and enhance the user experience.

For example: if a user's mobile phone establishes a Bluetooth communication link with the user's notebook computer, a Bluetooth module in the notebook computer will perform real-time detection on a Bluetooth signal strength of a Bluetooth module in the mobile phone. If the Bluetooth module in the notebook computer detects that the Bluetooth signal strength of the Bluetooth module in the mobile phone is already less than a second preset threshold, that is, the user has carried the mobile phone and left the notebook computer, at which time, the notebook computer will be powered off, or enter into the sleep mode, or enter into the suspend mode. Here, it should be noted that the second preset threshold is greater than or equal to the first preset threshold.

In an embodiment of the present application, there is also provided a controlling method; the method is applied to a first electronic apparatus, and the first electronic apparatus detects whether there is a first Bluetooth signal in the current detection range or not; if so, then the first electronic apparatus sends a first control command to a second electronic apparatus, the first control command being used for indicating the second electronic apparatus to switch from a first operating mode running currently to a second operating mode. Simply speaking, as long as the first electronic apparatus detects there is the first Bluetooth signal nearby, the first electronic apparatus will notify the second electronic apparatus to switch operating modes. Thereby, the first electronic apparatus can control the operating modes of the second electronic apparatus by establishing a Bluetooth communication link with the second electronic apparatus.

Figure 10:
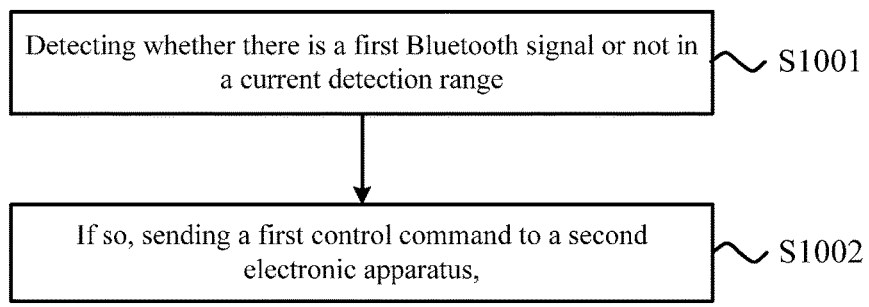
FIG. 10 is a flow chart of a controlling method according to an embodiment of the present application.

FIG. 10 is a flow chart of a first controlling method according to an embodiment of the present application, the method comprising: S201: detecting whether there is a first Bluetooth signal in the current detection range or not; S202: if so, sending a first control command to a second electronic apparatus.

First, the controlling method described in conjunction with FIG. 10 in the present application is applied to the first electronic apparatus, the first electronic apparatus at least includes a Bluetooth module, and the Bluetooth module can perform real-time detection on whether there is a first Bluetooth signal in the current detection range or not.

If so, it indicates that when the second electronic apparatus with the Bluetooth module started enters the detection range of the Bluetooth module in the first electronic apparatus, the Bluetooth module in the first electronic apparatus will establish a communication link with the Bluetooth module in the second electronic apparatus.

After the Bluetooth module in the first electronic apparatus establishes a communication link with the Bluetooth module in the second electronic apparatus, the first electronic apparatus acquires a first Bluetooth signal of the Bluetooth module in the second electronic apparatus via its own Bluetooth module; at this time, the first electronic apparatus is triggered to send a first control command to the second electronic apparatus based on the first Bluetooth signal. The first control command just is used for controlling the second electronic apparatus to switch from a first operating mode to a second operating mode. Here, it should be noted that the first operating mode is an Off state of the second electronic apparatus, and the second operating mode is a normal operating mode of the second electronic apparatus. That is, the second electronic apparatus can be triggered to start up from the Off state by the first control command.

For example: the first electronic apparatus is a mobile phone, the second electronic apparatus is a notebook computer, and the notebook computer is in an Off state; of course, the Bluetooth module in the notebook computer according to the embodiment of the present application will continue to run when the notebook computer is in the Off state; when the mobile phone starts the Bluetooth module, and moves into the range where the Bluetooth signal of the Bluetooth module of the notebook computer can be detected, the mobile phone generates a first control command, and sends the first control command to the notebook computer; after receiving the first control command, the notebook computer will start up directly. Of course, the notebook computer also may switch from a sleep mode to a normal operating mode.

Further, in the embodiment of the present application, in order to ensure that the first electronic apparatus sends the first control command to the second electronic apparatus accurately, after detecting the first Bluetooth signal, the first electronic apparatus will determine whether a strength of the first Bluetooth signal detected is greater than or equal to a first preset threshold or not, and if the strength of the first Bluetooth signal is greater than or equal to the first preset threshold, sends the first control command to the second electronic apparatus.

For example, when the user holds the mobile phone and enters a range covered by a Bluetooth module signal of a portable terminal, the closer the mobile phone to the portable terminal, the greater the Bluetooth signal strength detected by the Bluetooth module in the mobile phone; when the Bluetooth signal strength detected by the Bluetooth module in the mobile phone is greater than the first preset threshold, the mobile phone will send the first control command to the portable terminal.

Further, after the second electronic apparatus switches from the first operating mode to the second operating mode, the Bluetooth module in the first electronic apparatus will continue to detect and acquire the Bluetooth signal strength of the Bluetooth module in the second electronic apparatus, that is, to acquire a strength of the second Bluetooth signal of the Bluetooth module in the second electronic apparatus, then the first electronic apparatus will determine whether the second Bluetooth signal strength is less than or equal to a second preset threshold. If the second Bluetooth signal strength is less than or equal to the second preset threshold, send a second control command to the second electronic apparatus. The second electronic apparatus is used for indicating the second electronic apparatus to switch from the second operating mode to the first operating mode. Thus, the first electronic apparatus performs real-time control on the second electronic apparatus to restore the original operating mode, so that the control of the electronic apparatus no longer requires a remote server to participate, which reduces the user's operational processes, reduces amount of exchanged information, and saves network resources.

Figure 11:
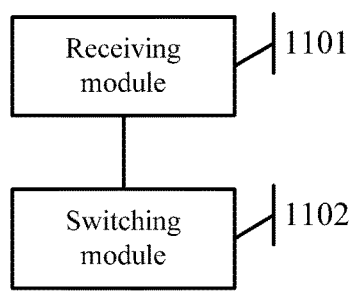
FIG. 11 is a structural schematic diagram of a device for switching operating modes according to an embodiment of the present application.

Corresponding to the method for switching operating modes according to the present application described in conjunction with FIG. 9, in an embodiment of the present application, there is further provided a device for switching operating modes; FIG. 11 is a structural schematic diagram of a controlling device according to an embodiment of the present application, the controlling device comprising: a receiving module 1101, for receiving a first control command for switching operating states, the first control command being transmitted based on a Bluetooth protocol; a switching module 1102, for switching a first operating mode running currently to a second operating mode different from the first operating mode according to the first control command.

Figure 12:
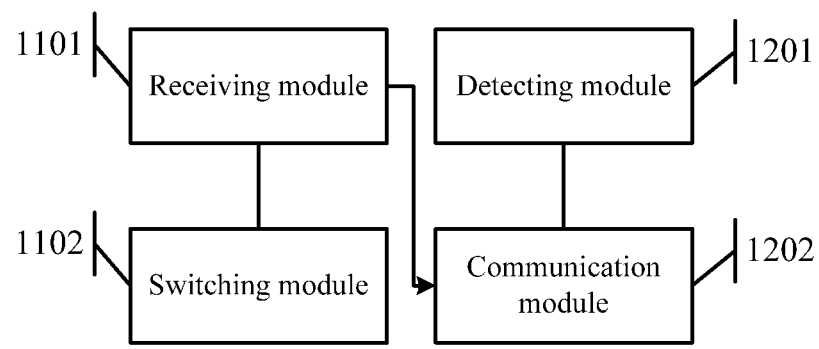
FIG. 12 is a structural schematic diagram of another device for switching operating modes according to an embodiment of the present application.

Further, as shown in FIG. 12, the controlling device further comprises: a detecting module 1201, for detecting whether there is a Bluetooth signal of a Bluetooth module in a second electronic apparatus in a detection range or not by a signal detecting device; a communicating module 1202 for, when there is the Bluetooth signal, establishing a communication link with the Bluetooth module in the second electronic apparatus.

Further, the switching module 1102 in the embodiment of the present application is specifically used for acquiring a startup key carried in the first control command, matching the startup key with a preset key. When the startup key matches the preset key, switching the first operating mode running currently to the second operating mode.

Further, the receiving module 1101 in the embodiment of the present application is further used for acquiring a second control command for switching the operating states.

The switching module 1102 is further used for switching the second operating mode to the first operating mode according to the second control command.

Figure 13:
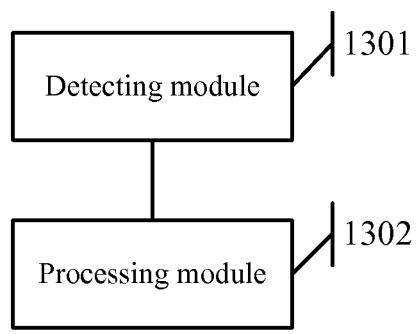
FIG. 13 is a structural schematic diagram of a controlling device according to an embodiment of the present application.

Corresponding to the controlling method described in conjunction with FIG. 10 in the present application, in an embodiment of the present application, there is further provided a controlling device. FIG. 13 is a structural schematic diagram of a controlling device according to an embodiment of the present application, the device comprising: a detecting module 1301, for detecting whether there is a first Bluetooth signal in a current detection range or not; a processing module 1302 for, when there is the first Bluetooth signal, sending a first control command to a second electronic apparatus, the first control command being used for indicating the second electronic apparatus to switch from a first operating mode running currently to a second operating mode.

Further, the processing module 1302 in the embodiment of the present application is specifically used for determining whether a strength of the first Bluetooth signal detected is greater than or equal to the first preset threshold or not, and if the strength of the first Bluetooth signal is greater than or equal to the first preset threshold, sending the first control command to the second electronic apparatus.

In an embodiment of the present application, there is further provided a system for switching operating modes, the system comprising: a first electronic apparatus and a second electronic apparatus, the first electronic apparatus being used for, when detecting a first Bluetooth signal of the second electronic apparatus, sending a first control command for indicating the second electronic apparatus to switch operating modes to the second electronic apparatus; the second electronic apparatus being used for receiving the first control command sent by the first electronic apparatus, and switching a first operating mode running currently to a second operating mode different from the first operating mode according to the first control command.

Further, the first electronic apparatus is specifically used for enabling a Bluetooth module in the first electronic apparatus to establish a communication link with a Bluetooth module in the second electronic apparatus, and sending the first control command to the second electronic apparatus via the Bluetooth module in the first electronic apparatus.

Further, the first electronic apparatus is specifically used for determining whether a strength of the first Bluetooth signal detected is greater than or equal to a first preset threshold or not, and if so, sending the first control command to the second electronic apparatus.

Further, the first electronic apparatus is further used for acquiring a strength of a second Bluetooth signal of a Bluetooth module in the second electronic apparatus, and determining whether the strength of the second Bluetooth signal is less than or equal to a second preset threshold or not, if so, sending a second control command to the second electronic apparatus, the second control command being used for indicating the second electronic apparatus to switch from the second operating mode to the first operating mode.

Further, the second electronic apparatus is specifically used for acquiring a startup key carried in the first control command, matching the startup key with a preset key, and when the startup key matches the preset key, switching the first operating mode running currently to the second operating mode.

Further, the second electronic apparatus is specifically used for receiving the second control command, and switching the second operating mode to the first operating mode according to the second control command.

The method for switching operating modes described in conjunction with FIG. 9 can be used for mode switching or state switching of any electronic apparatus, which, for example, can be used for the adjusting step in the information processing method described in conjunction with FIG. 1, that is, for adjusting the current state of the electronic apparatus to a state that at least one application in the electronic apparatus is in a logout state. That is to say, in a case that the determining whether the at least one parameter meets a first preset condition or not is executed by a preset electronic apparatus, the adjusting the current state of the electronic apparatus to the information inaccessible state may include: receiving a first control command for switching the operating states from the preset electronic apparatus, the first control command being transmitted based on a Bluetooth protocol; switching a first operating mode running currently to a second operating mode different from the first operating mode according to the first control command, the first operating mode having the current state, and the second operating mode having the information inaccessible state. Correspondingly, the controlling method described in conjunction with FIG. 10 can be implemented in the preset electronic apparatus. Typically, the step that the preset electronic apparatus sends the first control command includes: detecting whether there is a first Bluetooth signal in the current detection range; if so, sending the first control command to the electronic apparatus, the first control command being used for indicating the second electronic apparatus to switch from the first operating mode running currently to the second operating mode.

The device for switching operating modes described in conjunction with FIG. 11 can be used for mode switching or state switching of any electronic apparatus, which, for example, can be used for the adjusting operation of the second controlling unit of the preset electronic apparatus described in conjunction with FIG. 4. That is, for adjusting the current state of the electronic apparatus to the information inaccessible state. That is to say, the second controlling unit in the preset electronic apparatus may include: a detecting module, for detecting whether there is a first Bluetooth signal in a current detection range or not; a processing module for, when there is the first Bluetooth signal, sending a first control command to the electronic apparatus having the first Bluetooth signal, the first control command being used for indicating the electronic apparatus to switch from a first operating mode running currently to a second operating mode. Corresponding to the operation of the second controlling unit in the preset electronic apparatus, the electronic apparatus having the first Bluetooth signal may include: a receiving module, for receiving a first control command for switching the operating states, the first control command being transmitted based on a Bluetooth protocol; a switching module, for switching from a first operating mode running currently to a second operating mode different from the first operating mode according to the first control command.

Those skilled in the art should understand that, the embodiments of the present application may provide a method, a system, or a computer program product. Therefore, the present application may adopt a pure hardware embodiment, a pure software embodiment, or an embodiment combining software and hardware aspects. Moreover, the present application may adopt the form of computer program product which is implemented on one or more computer usable storage mediums (including, but not limited to, a magnetic storage device, a CD-ROM, an optical storage device, etc.) with computer usable program codes stored thereon.

The present application is described herein with reference to flowchart charts and/or block diagrams of methods, apparatuses (systems), and computer program products according to the embodiments of the application. It should be understood that each flow and/or block in the flowchart and/or block diagram, and a combination of flows and/or blocks in the flowchart and/or block diagram can be implemented by computer program instructions. These computer program instructions may be provided to a general purpose computer, a special purpose computer, an embedded processor or a processor of other programmable data processing apparatus to form a machine, such that devices for implementing functions specified by one or more flows in a flowchart and/or one or more blocks in a block diagram may be generated by executing the instructions by the processor of the computer or other programmable data processing apparatus.

These computer program instructions may also be stored in a computer-readable memory that can guide a computer or other programmable data processing apparatus to function in a particular manner, such that the instructions stored in the computer-readable memory produce a manufactured article including an instruction device, the instruction device implementing the functions specified by one or more flows in a flowchart and/or one or more blocks in a block diagram.

These computer program instructions may also be loaded onto a computer or other programmable data processing apparatus, such that a series of process steps may be executed on the computer or other programmable data processing apparatus to produce process implemented by the computer, whereby the instructions executed on the computer or other programmable data processing apparatus provide steps for implementing the functions specified by one or more flows in a flowchart and/or one or more blocks in a block diagram.

Specifically, the computer program instructions corresponding to the information processing method in the embodiment of the present application may be stored on the storage mediums such as optical disk, hard disk and USB flash, and when the computer program instructions on the storage mediums, which are corresponding to the information processing method executed by the electronic apparatus, are read or executed by an electronic apparatus, there are steps of: when a current state of the electronic apparatus is an information accessible state, obtaining an information of at least one parameter for determining whether it is necessary to adjust the current state from the information accessible state to an information inaccessible state or not; determining whether the at least one parameter meets a first preset condition or not to obtain a first determination result; when the first determination result is YES, adjusting the current state of the electronic apparatus to the information inaccessible state.

Optionally, a computer command stored in storage medium, corresponding to the step of obtaining an information of at least one parameter for determining whether it is necessary to adjust the current state from the information accessible state to an information inaccessible state or not, in the implementation process, specifically includes a step of obtaining a distance between the electronic apparatus and a preset electronic apparatus.

Optionally, a computer command stored in storage medium, corresponding to the step of determining whether the at least one parameter meets a first preset condition or not to obtain a first determination result, in the implementation process, specifically includes a step of determining whether the distance is greater than a preset distance or not, to obtain the first determination result.

Optionally, a computer command stored in storage medium, corresponding to the step of obtaining an information of at least one parameter for determining whether it is necessary to adjust the current state from the information accessible state to an information inaccessible state or not, in the implementation process, specifically includes a step of obtaining a wireless signal strength between the electronic apparatus and a preset electronic apparatus.

Optionally, a computer command stored in storage medium, corresponding to the step of determining whether the at least one parameter meets a first preset condition or not to obtain a first determination result, in the implementation process, specifically includes a step of determining whether the wireless signal strength is less than a preset strength or not, to obtain the first determination result.

Optionally, a computer command stored in storage medium, corresponding to the step of adjusting the current state of the electronic apparatus to the information inaccessible state, in the implementation process, specifically includes steps of: adjusting the current state of the electronic apparatus to an Off state; or adjusting the current state of the electronic apparatus to a locked state, or adjusting the current state of the electronic apparatus to a state that at least one application in the electronic apparatus is in a logout state.

Moreover, the computer program instructions corresponding to the information processing method according to the embodiment of the present application may be stored on the storage mediums such as optical disk, hard disk and USB flash, and when the computer program instructions on the storage mediums, which are corresponding to the information processing method executed by the electronic apparatus, are read or executed by an electronic apparatus, there are steps of: sending an inquiry command to an electronic apparatus to inquire an apparatus state of the electronic apparatus, and receiving an apparatus state information returned by the electronic apparatus; when the apparatus state information indicates that a current state of the electronic apparatus is an information accessible state, obtaining an information of at least one parameter for determining whether it is necessary to adjust the current state from the information accessible state to the information inaccessible state or not; determining whether the at least one parameter meets a first preset condition or not to obtain a first determination result; when the first determination result is YES, adjusting the current state of the electronic apparatus to the information inaccessible state.

Optionally, a computer command stored in storage medium, corresponding to the step of obtaining an information of at least one parameter for determining whether it is necessary to adjust the current state from the information accessible state to the information inaccessible state or not, in the implementation process, specifically includes a step of: obtaining a distance between the electronic apparatus and a preset electronic apparatus.

Optionally, a computer command stored in storage medium, corresponding to the step of determining whether the at least one parameter meets a first preset condition or not to obtain a first determination result, in the implementation process, specifically includes a step of: determining whether the distance is greater than a preset distance or not, to obtain the first determination result.

Optionally, a computer command stored in storage medium, corresponding to the step of obtaining an information of at least one parameter for determining whether it is necessary to adjust the current state from the information accessible state to the information inaccessible state or not, in the implementation process, specifically includes a step of: obtaining a wireless signal strength between the electronic apparatus and a preset electronic apparatus.

Optionally, a computer command stored in storage medium, corresponding to the step of determining whether the at least one parameter meets a first preset condition or not to obtain a first determination result, in the implementation process, specifically includes a step of determining whether the wireless signal strength is less than a preset strength or not, to obtain the first determination result.

Optionally, a computer command stored in storage medium, corresponding to the step of adjusting the current state of the electronic apparatus to the information inaccessible state, in the implementation process, specifically includes at least one of steps of: sending control information to the electronic apparatus, to adjust the current state of the electronic apparatus to an Off state; sending control information to the electronic apparatus, to adjust the current state of the electronic apparatus to a locked state; and sending control information to the electronic apparatus, to adjust the current state of the electronic apparatus to a state that at least one application in the electronic apparatus is in a logout state.

It is evident that one person skilled in the art can make various changes or modifications to the present application without departure from the spirit and scope of the application. Thus, if these changes and modifications to the present application are within the scope of the claims of the present application and equivalent thereof, the present application also intends to include all such changes and modifications within its scope.

The invention claimed is:
1. An information processing method applied to an electronic apparatus, the method comprising:
in a case that a current state of the electronic apparatus is an information accessible state, obtaining an information of at least one parameter for determining whether it is necessary to adjust the current state from the information accessible state to an information inaccessible state or not;

determining whether the at least one parameter meets a first preset condition or not to obtain a first determination result;

adjusting the current state of the electronic apparatus according to the first determination result, wherein the information inaccessible state comprises a state that at least one application in the electronic apparatus is in a logout state while the electronic apparatus is in a working state other than an off state or a locked state, wherein, the determining whether the at least one parameter meets the first preset condition or not is determined by a preset electronic apparatus, and the adjusting the current state of the electronic apparatus to the information inaccessible state comprises:

receiving a first control command for switching operating states from the preset electronic apparatus, the first control command being transmitted based on a short-range wireless connection protocol and the first control command being sent from the preset electronic apparatus when a short-range wireless connection signal strength of a short-range wireless connection module in the electronic apparatus detected by the preset electronic apparatus is greater than or equal to a first preset threshold;

switching a first operating mode running currently to a second operating mode different from the first operating mode according to the first control command, the first operating mode comprising the current state, and the second operating mode comprising the information inaccessible state, wherein, the switching the first operating mode running currently to the second operating mode different from the first operating mode comprises:

acquiring a startup key carried in the first control command; and matching the startup key with a preset key; and in a case that the startup key matches the preset key, switching the first operating mode running currently to the second operating mode.

2. The method according to claim 1, wherein the adjusting the current state of the electronic apparatus according to the first determination result comprises adjusting the current state of the electronic apparatus to the information inaccessible state in a case that the first determination result is YES.

3. The method according to claim 1, wherein the obtaining an information of at least one parameter for determining whether it is necessary to adjust the current state from the information accessible state to an information inaccessible state or not comprises obtaining a distance between the electronic apparatus and the preset electronic apparatus.

4. The method according to claim 3, wherein the determining whether the at least one parameter meets a first preset condition or not to obtain a first determination result comprises determining whether the distance between the electronic apparatus and the preset electronic apparatus is greater than a preset distance or not, to obtain the first determination result.

5. The method according to claim 3, wherein the obtaining a distance between the electronic apparatus and the preset electronic apparatus comprises: the electronic apparatus scanning a ranging signal sent by the preset electronic apparatus, to obtain the distance from the preset electronic apparatus; the electronic apparatus, when determining that the distance between the electronic apparatus and the preset electronic apparatus meets a second preset condition, stopping scanning the ranging signal, and detecting an acceleration of the electronic apparatus; and, the electronic apparatus, when determining that the acceleration is greater than or equal to a first threshold, resuming scanning the ranging signal, to update the distance between the electronic apparatus and the preset electronic apparatus.

6. The method according to claim 5, wherein the electronic apparatus, when determining that the distance between the electronic apparatus and the preset electronic apparatus meets the second preset condition, stopping scanning the ranging signal comprises the electronic apparatus, when determining that the distance between the electronic apparatus and the preset electronic apparatus is less than or equal to a second threshold, stopping scanning the ranging signal.

7. The method according to claim 5, wherein the electronic apparatus, when determining that the distance between the electronic apparatus and the preset electronic apparatus meets the second preset condition, stopping scanning the ranging signal comprises the electronic apparatus, when determining that the distance between the electronic apparatus and the preset electronic apparatus is greater than or equal to a second threshold, stopping scanning the ranging signal.

8. The method according to claim 1, wherein the obtaining an information of at least one parameter for determining whether it is necessary to adjust the current state from the information accessible state to an information inaccessible state or not comprises obtaining a wireless signal strength between the electronic apparatus and the preset electronic apparatus.

9. The method according to claim 8, wherein the determining whether the at least one parameter meets a first preset condition or not to obtain a first determination result comprises determining whether the wireless signal strength is less than a preset strength or not to obtain the first determination result.

10. The method according to claim 8, wherein the obtaining wireless signal strength between the electronic apparatus and a preset electronic apparatus comprises: predetermining a first distance from the preset electronic apparatus; obtaining a first wireless signal strength of the preset electronic apparatus at the first distance with respect to the electronic apparatus; establishing and storing a correlation relationship between the first distance and the first wireless signal strength; and, determining the wireless signal strength corresponding to the distance between the electronic apparatus and the preset electronic apparatus according to the correlation relationship.

11. The method according to claim 10, wherein the predetermining a first distance from the preset electronic apparatus comprises: displaying a reference image; receiving a response signal sent by the preset electronic apparatus, the response signal indicating that the preset electronic apparatus completes acquisition of the reference image; and determining the first distance between the electronic apparatus and the preset electronic apparatus according to the response signal.

12. An electronic apparatus, comprising:
a circuit configured to:
in a case that a current state of the electronic apparatus is an information accessible state, obtain an information of at least one parameter for determining whether it is necessary to adjust the current state from the information accessible state to an information inaccessible state or not;
determine whether the at least one parameter meets a first preset condition or not to obtain a first determination result; and,
adjust the current state of the electronic apparatus to the information inaccessible state according to the first determination result,
wherein the information inaccessible state comprises a state that at least one application in the electronic apparatus is in a logout state while the electronic apparatus is in a working state other than an off state or a locked state,
wherein, the circuit is further configured to:
receive a first control command for switching operating states from the preset electronic apparatus, the first control command is transmitted based on a short-range wireless connection protocol and the first control command being sent from the preset electronic apparatus when a short-range wireless connection signal strength of a short-range wireless connection module in the electronic apparatus detected by the preset electronic apparatus is greater than or equal to a first preset threshold;
switch a first operating mode running currently to a second operating mode different from the first operating mode according to the first control command, the first operating mode comprising the current state, and the second operating mode comprising the information inaccessible state, wherein the circuit is able to perform the switch, because the circuit is configured to:
acquire a startup key carried in the first control command; and
match the startup key with a preset key and, in a case that the startup key matches the preset key, switch the first operating mode that is running currently to the second operating mode.

13. The electronic apparatus according to claim 12, wherein the circuit is further configured to adjust the current state of the electronic apparatus to the information inaccessible state in a case that the first determination result is YES.

14. The electronic apparatus according to claim 12, wherein the circuit is further configured to obtain a distance between the electronic apparatus and the preset electronic apparatus.

15. The electronic apparatus according to claim 14, wherein the circuit is further configured to determine whether the distance between the electronic apparatus and the preset electronic apparatus is greater than a preset distance or not, to obtain the first determination result.

16. The electronic apparatus according to claim 14, wherein the circuit is further configured to: scan a ranging signal sent by the preset electronic apparatus, to obtain the distance from the preset electronic apparatus, and when determining that the distance between the electronic apparatus and the preset electronic apparatus meets a second preset condition, stopping scanning the ranging signal; in a case that the scanning module stops scanning the ranging signal, detect an acceleration of first electronic apparatus; and, when the circuit determines that the acceleration is greater than or equal to a first threshold, resume scanning the ranging signal, to update the distance between the electronic apparatus and the preset electronic apparatus.

17. The electronic apparatus according to claim 16, wherein the circuit is to: when the circuit determines that the distance between the electronic apparatus and the preset electronic apparatus is less than or equal to a second threshold, or greater than or equal to a third threshold, stop scanning the ranging signal.

18. The electronic apparatus according to claim 12, wherein the circuit is further configured to obtain a wireless signal strength between the electronic apparatus and a preset electronic apparatus.

19. The electronic apparatus according to claim 18, wherein the circuit is further configured to determine whether the wireless signal strength is less than a preset strength or not, to obtain the first determination result.

20. The electronic apparatus according to claim 18, wherein the circuit is further configured to predetermine a first distance between the electronic apparatus and the preset electronic apparatus; and, obtain a first wireless signal strength of the preset electronic apparatus at the first distance with respect to the electronic apparatus, establish and store a correlation relationship between the first distance and the first wireless signal strength, and determine the wireless signal strength corresponding to the distance between the electronic apparatus and the preset electronic apparatus according to the correlation relationship.

21. The electronic apparatus according to claim 20, wherein the circuit is further configured to display a reference image, receive a response signal sent by the preset electronic apparatus, and determine the first distance between the electronic apparatus and the preset electronic apparatus according to the response signal, the response signal indicating that the preset electronic apparatus completes acquisition of the reference image.

22. A preset electronic apparatus, comprising:
a circuit configured to:
send an inquiry command to an electronic apparatus to inquire an apparatus state of an electronic apparatus, and receive an apparatus state information returned by the electronic apparatus;
in a case that the apparatus state information indicates that a current state of the electronic apparatus is an information accessible state, obtain an information of at least one parameter for determining whether it is necessary to adjust the current state from the information accessible state to an information inaccessible state or not;
determine whether the at least one parameter meets a first preset condition or not to obtain a first determination result; and,
adjust the current state of the electronic apparatus to the information inaccessible state according to the first determination result,
wherein the information inaccessible state comprises a state that at least one application in the electronic apparatus is in a logout state while the electronic apparatus is in a working state other than an off state or a locked state,
wherein, the circuit is further configured to:
detect whether there is a first short-range wireless connection signal in a current detection range or not;
in a case that there is the first short-range wireless connection signal, send a first control command to the electronic apparatus having the first short-range wireless connection signal, the first control command is used for indicating the electronic apparatus to switch from a first operating mode that is running currently to a second operating mode, the first operating mode has the current state, and the second operating mode having the information inaccessible state; and wherein the circuit is further configured to send a startup key carried in the first control command, the startup key is used for indicating the electronic apparatus to switch from a first operating mode to a second operating mode when the startup key matches a preset key; and wherein the circuit is further configured to:

determine whether a strength of the first short-range wireless connection signal is greater than or equal to first preset threshold, if the strength of the first short-range wireless connection signal is greater than or equal to the first preset threshold, and send the first control command to the electronic apparatus based on a short-range wireless connection protocol.

23. The preset electronic apparatus according to claim 22, wherein the circuit is further configured to adjust the current state of the electronic apparatus to the information inaccessible state in a case that the first determination result is YES.

24. The preset electronic apparatus according to claim 22, wherein the circuit is further configured to obtain a distance between the preset electronic apparatus and the electronic apparatus.

25. The preset electronic apparatus according to claim 24, wherein the circuit is further configured to determine whether the distance between the electronic apparatus and the preset electronic apparatus is greater than a preset distance or not, to obtain the first determination result.

26. The preset electronic apparatus according to claim 22, wherein the circuit is further configured to obtain a wireless signal strength between the preset electronic apparatus and the electronic apparatus.

27. The preset electronic apparatus according to claim 26, wherein the circuit is further configured to determine whether the wireless signal strength is less than a preset strength or not, to obtain the first determination result.

* * * * *